US012676891B2

(12) United States Patent
Kanekar

(10) Patent No.: US 12,676,891 B2
(45) Date of Patent: *Jul. 7, 2026

(54) ENDPOINT SECURITY GROUPS IN PRIVATE MULTI-ACCESS EDGE COMPUTE NETWORKS

(71) Applicant: Microsoft Technology Licensing, LLC, Redmond, WA (US)

(72) Inventor: Bhushan Mangesh Kanekar, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 18/391,249

(22) Filed: Dec. 20, 2023

(65) Prior Publication Data

US 2025/0211620 A1      Jun. 26, 2025

(51) Int. Cl.
*H04L 9/40* (2022.01)
(52) U.S. Cl.
CPC .......... *H04L 63/20* (2013.01); *H04L 63/0876* (2013.01); *H04L 63/104* (2013.01)
(58) Field of Classification Search
CPC .... H04L 63/20; H04L 63/0876; H04L 63/104
USPC .......................................................... 726/1
See application file for complete search history.

(56) References Cited

U.S. PATENT DOCUMENTS

2021/0120408 A1* 4/2021 Pazhyannur .......... H04L 63/101
2022/0006827 A1* 1/2022 Weingarten ......... G06F 9/44526
2023/0007026 A1* 1/2023 Weingarten ........... H04L 41/046
2023/0179583 A1* 6/2023 Bhagvath ............ H04L 63/0485
713/151
2024/0205251 A1* 6/2024 Weingarten ........... G06F 21/552

FOREIGN PATENT DOCUMENTS

WO     WO-2024049905 A1 *  3/2024   ......... H04L 63/0209

OTHER PUBLICATIONS

Sudbring, et al., "Application security groups", Retrieved From: https://learn.microsoft.com/en-us/azure/virtual-network/application-security-groups, Apr. 9, 2023, 3 Pages.

* cited by examiner

*Primary Examiner* — Aubrey H Wyszynski
(74) *Attorney, Agent, or Firm* — Han Gim; Newport IP, LLC

(57)                    ABSTRACT

Endpoint security groups include computing device endpoints that are classified according to commonly shared device features and capabilities including device type, function, role, or location. Endpoint security groups are used as an alternative identity mechanism for endpoints for purposes of security and data traffic policy enforcement rather than using conventional IP (Internet Protocol) addressing. Grouping endpoints reduces the scope of network management to enable dynamic policy enforcement for endpoints as they join, leave, and then rejoin computing networks, which is a common behavior, particularly for IoT (Internet-of-Things) devices in manufacturing environments. In an illustrative example, a private multi-access edge compute (MEC) platform supports a scalable policy definition and enforcement framework that provides consistent endpoint handling independent of network access methodology. Endpoint security groups facilitate improvements in security of network access and utilization and segmentation of data traffic on a fine-grained basis.

20 Claims, 22 Drawing Sheets

1300

Communicate with the endpoints from a computing server in the MEC platform, in which the endpoints are dynamically operable to join, leave, and rejoin the networked computing environment through an access network supporting multiple different access protocols — 1305

Classify the endpoints based on functional capabilities of the endpoints defined by one or more of computing device type, role, function, or location — 1310

Associate the endpoints according to the classification by functional capabilities with different endpoint security groups — 1315

Apply security policies to the endpoints based on their association with the different endpoint security groups, in which different IP (internet-protocol) addresses are assigned to network connections utilized by endpoints upon each instance of joining or rejoining the networked computing environment, in which the security policies are applied to the endpoints independent of the assigned IP addresses — 1320

Independently of the assigned IP addresses, automatically reapply the security policies to endpoints upon rejoining the networked computing environment subsequent to leaving the networked computing environment — 1325

*FIG 1*

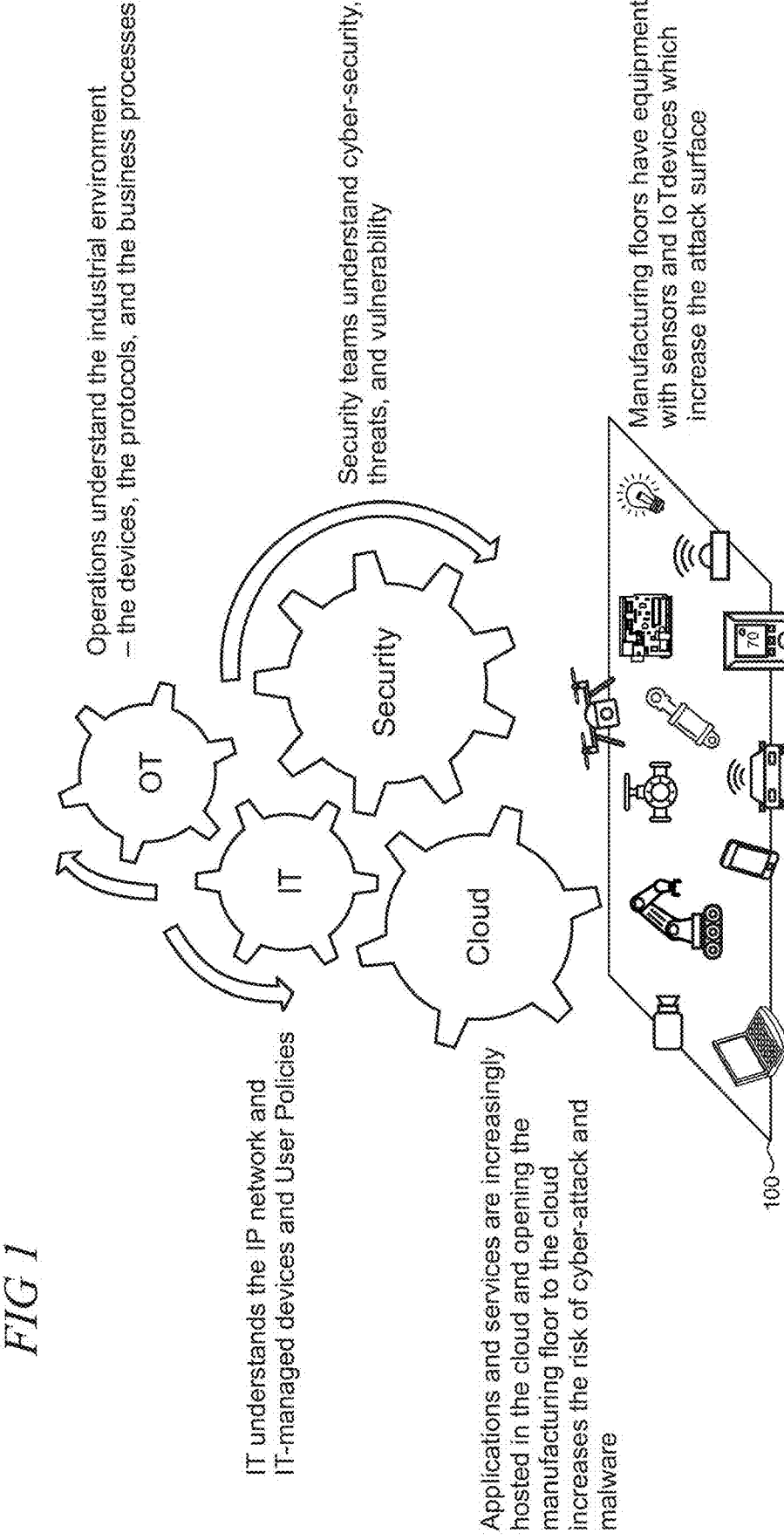

Operations understand the industrial environment – the devices, the protocols, and the business processes Security teams understand cyber-security, threats, and vulnerability Manufacturing floors have equipment with sensors and IoT devices which increase the attack surface IT understands the IP network and IT-managed devices and User Policies Applications and services are increasingly hosted in the cloud and opening the manufacturing floor to the cloud increases the risk of cyber-attack and malware Enterprise manufacturing floor

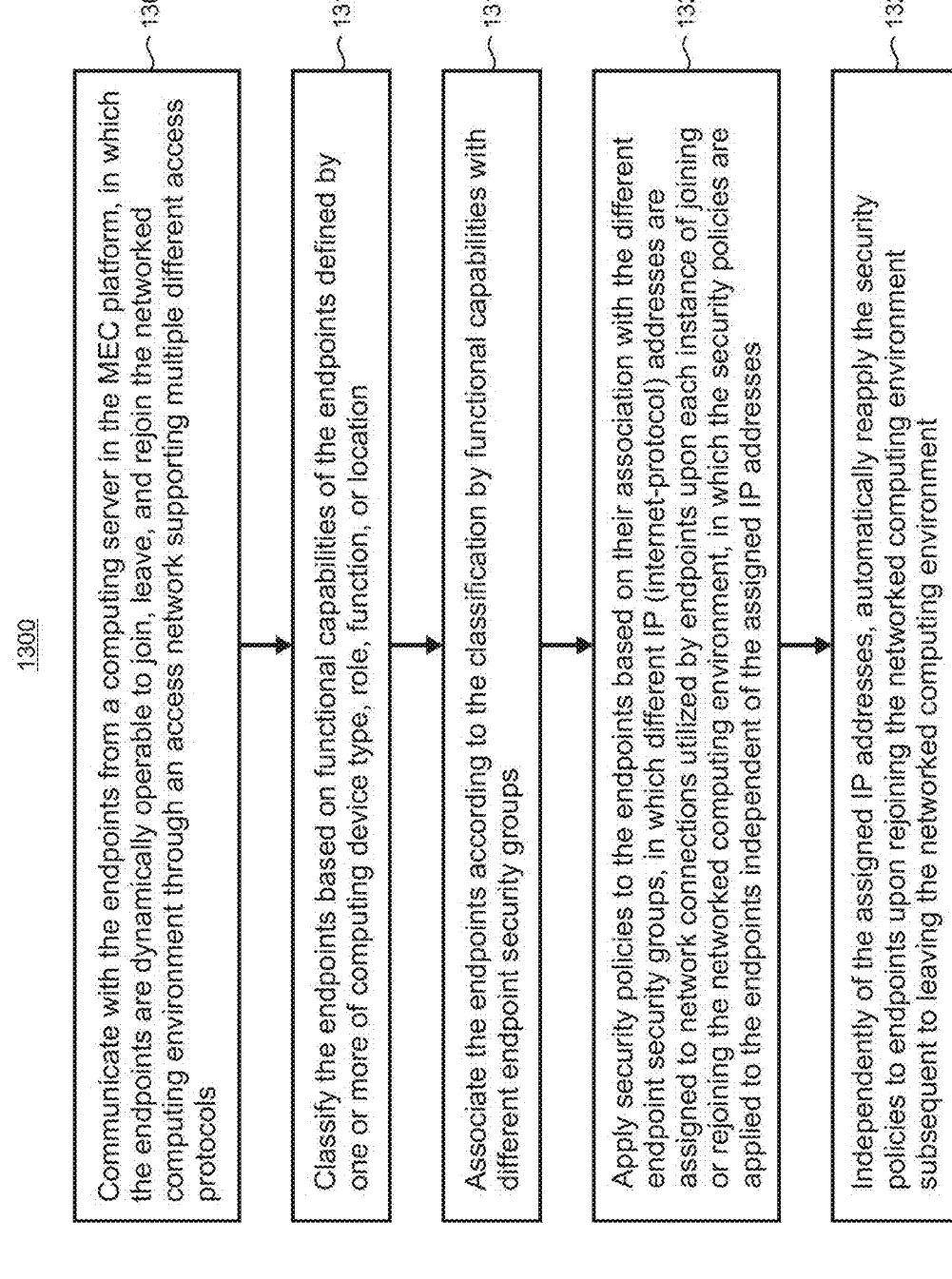

1300

Communicate with the endpoints from a computing server in the MEC platform, in which the endpoints are dynamically operable to join, leave, and rejoin the networked computing environment through an access network supporting multiple different access protocols ⟶ 1305

Classify the endpoints based on functional capabilities of the endpoints defined by one or more of computing device type, role, function, or location ⟶ 1310

Associate the endpoints according to the classification by functional capabilities with different endpoint security groups ⟶ 1315

Apply security policies to the endpoints based on their association with the different endpoint security groups, in which different IP (internet-protocol) addresses are assigned to network connections utilized by endpoints upon each instance of joining or rejoining the networked computing environment, in which the security policies are applied to the endpoints independent of the assigned IP addresses ⟶ 1320

Independently of the assigned IP addresses, automatically reapply the security policies to endpoints upon rejoining the networked computing environment subsequent to leaving the networked computing environment ⟶ 1325

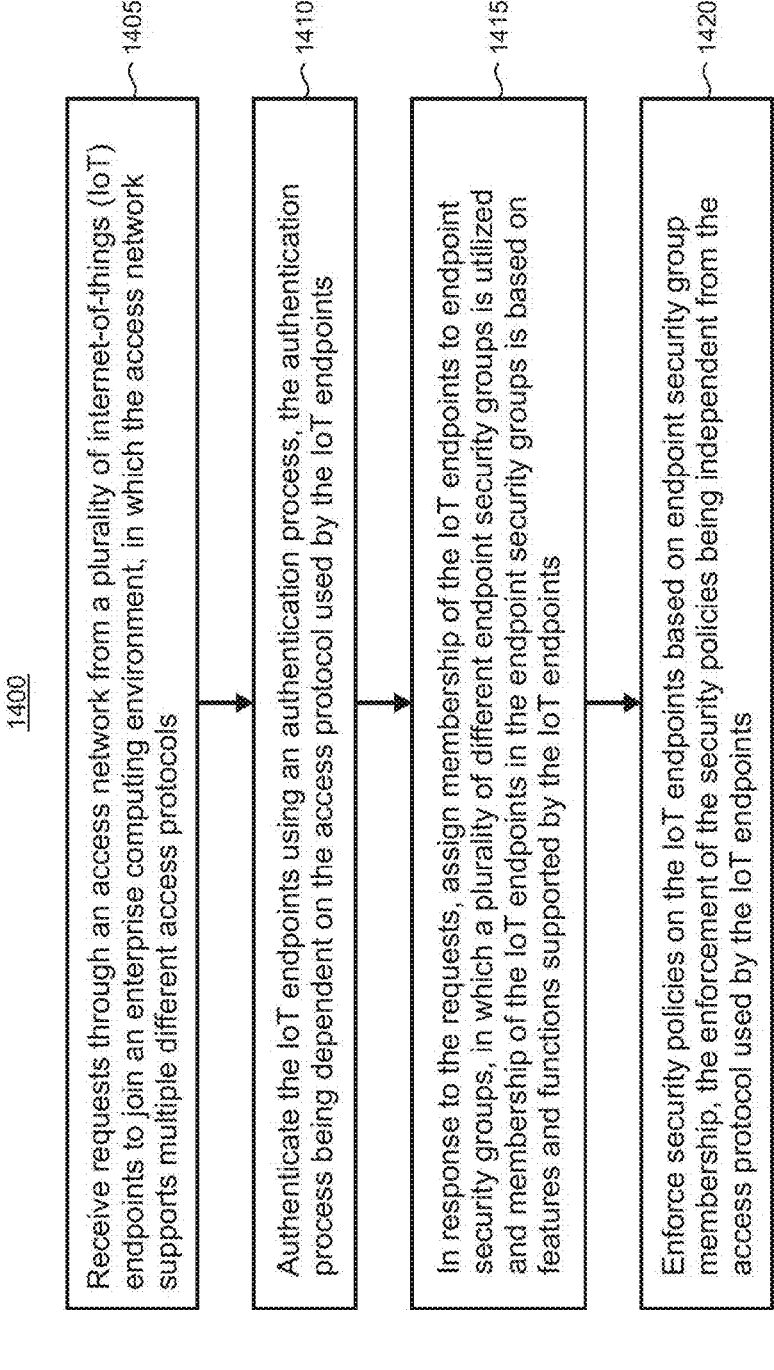

Receive requests through an access network from a plurality of internet-of-things (IoT) endpoints to join an enterprise computing environment, in which the access network supports multiple different access protocols ⟿ 1405

Authenticate the IoT endpoints using an authentication process, the authentication process being dependent on the access protocol used by the IoT endpoints ⟿ 1410

In response to the requests, assign membership of the IoT endpoints to endpoint security groups, in which a plurality of different endpoint security groups is utilized and membership of the IoT endpoints in the endpoint security groups is based on features and functions supported by the IoT endpoints ⟿ 1415

Enforce security policies on the IoT endpoints based on endpoint security group membership, the enforcement of the security policies being independent from the access protocol used by the IoT endpoints ⟿ 1420

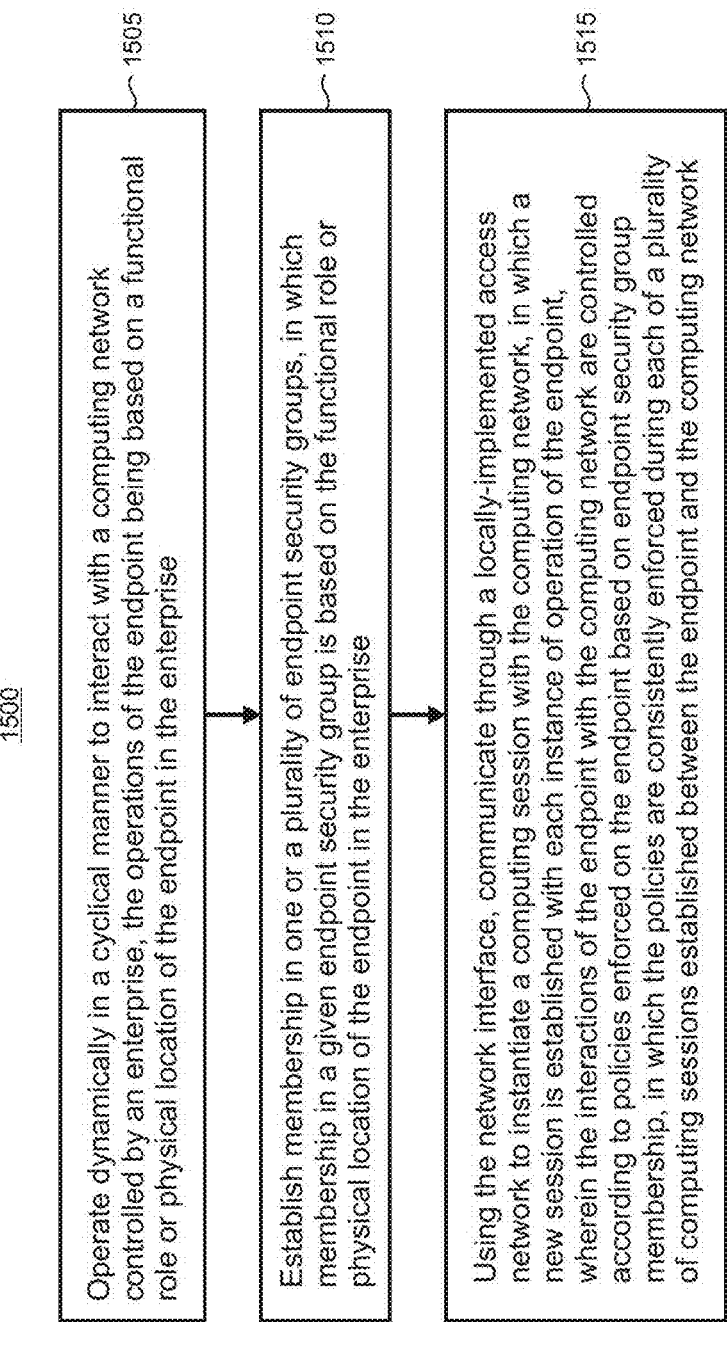

Operate dynamically in a cyclical manner to interact with a computing network controlled by an enterprise, the operations of the endpoint being based on a functional role or physical location of the endpoint in the enterprise ⟵ 1505

Establish membership in one or a plurality of endpoint security groups, in which membership in a given endpoint security group is based on the functional role or physical location of the endpoint in the enterprise ⟵ 1510

Using the network interface, communicate through a locally-implemented access network to instantiate a computing session with the computing network, in which a new session is established with each instance of operation of the endpoint, wherein the interactions of the endpoint with the computing network are controlled according to policies enforced on the endpoint based on endpoint security group membership, in which the policies are consistently enforced during each of a plurality of computing sessions established between the endpoint and the computing network ⟵ 1515

*FIG 16*

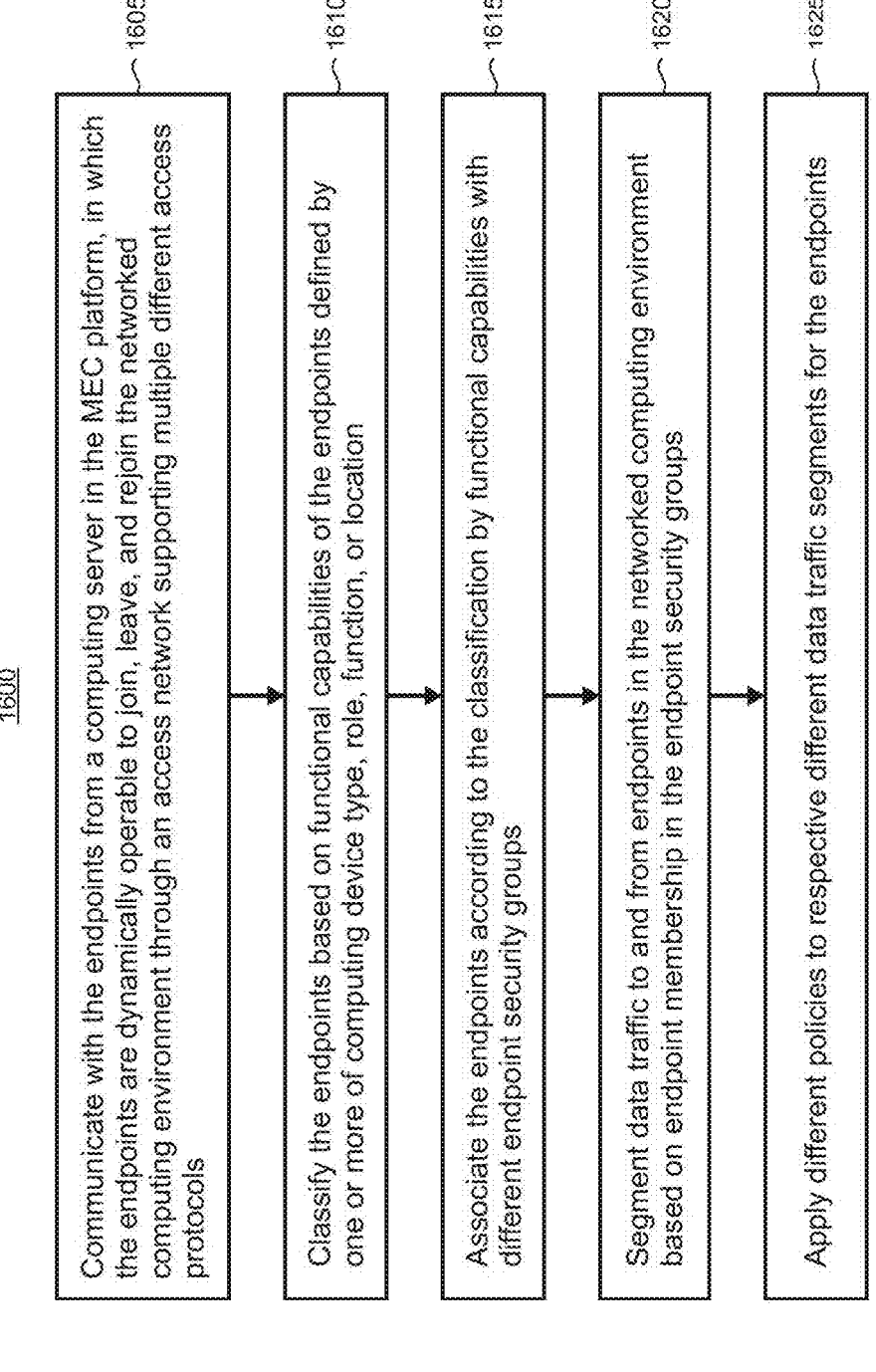

1600

Communicate with the endpoints from a computing server in the MEC platform, in which the endpoints are dynamically operable to join, leave, and rejoin the networked computing environment through an access network supporting multiple different access protocols

1605

Classify the endpoints based on functional capabilities of the endpoints defined by one or more of computing device type, role, function, or location

1610

Associate the endpoints according to the classification by functional capabilities with different endpoint security groups

1615

Segment data traffic to and from endpoints in the networked computing environment based on endpoint membership in the endpoint security groups

1620

Apply different policies to respective different data traffic segments for the endpoints

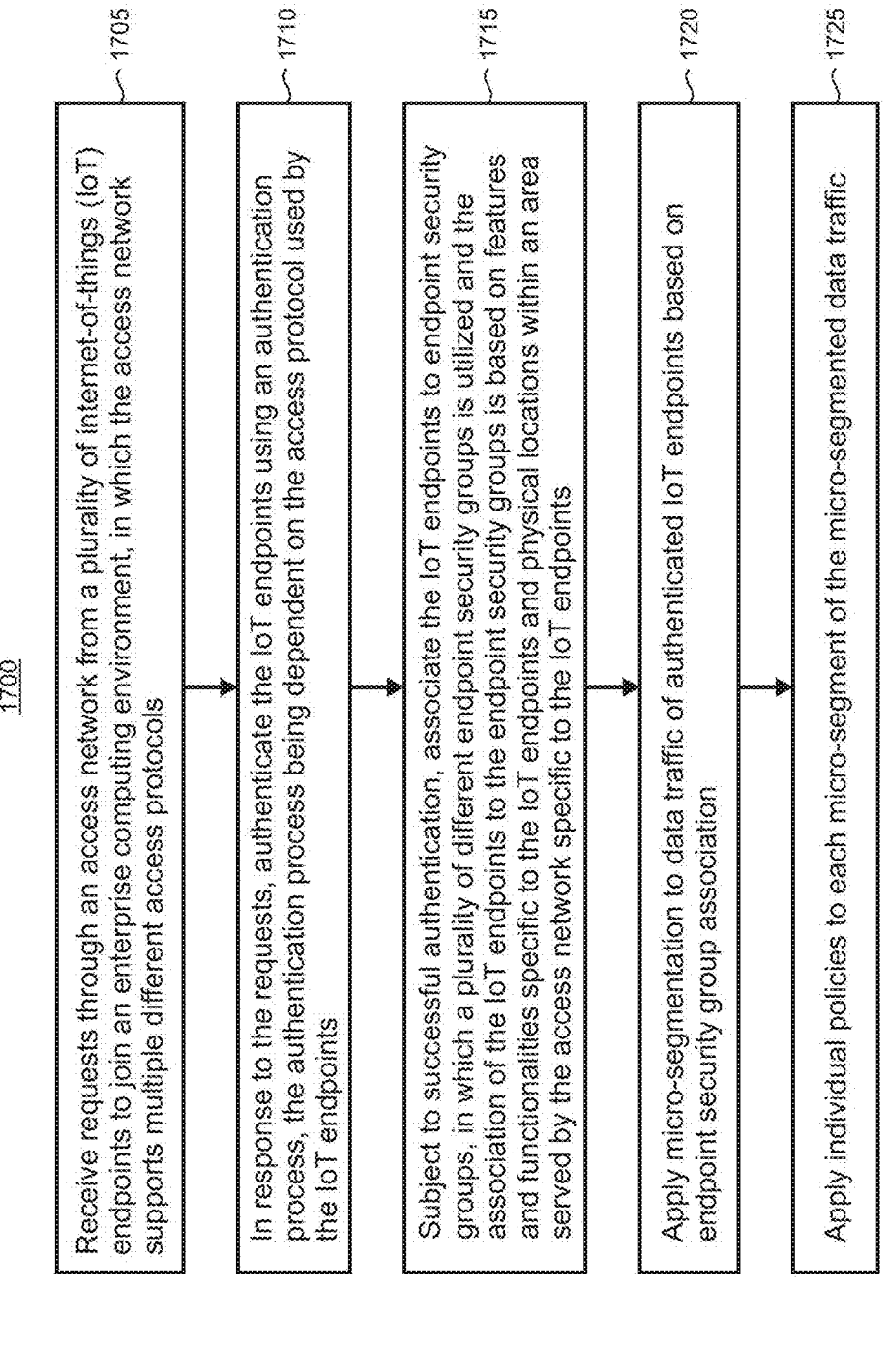

1700

Receive requests through an access network from a plurality of internet-of-things (IoT) endpoints to join an enterprise computing environment, in which the access network supports multiple different access protocols — 1705

In response to the requests, authenticate the IoT endpoints using an authentication process, the authentication process being dependent on the access protocol used by the IoT endpoints — 1710

Subject to successful authentication, associate the IoT endpoints to endpoint security groups, in which a plurality of different endpoint security groups is utilized and the association of the IoT endpoints to the endpoint security groups is based on features and functionalities specific to the IoT endpoints and physical locations within an area served by the access network specific to the IoT endpoints — 1715

Apply micro-segmentation to data traffic of authenticated IoT endpoints based on endpoint security group association — 1720

Apply individual policies to each micro-segment of the micro-segmented data traffic — 1725

*FIG 18*

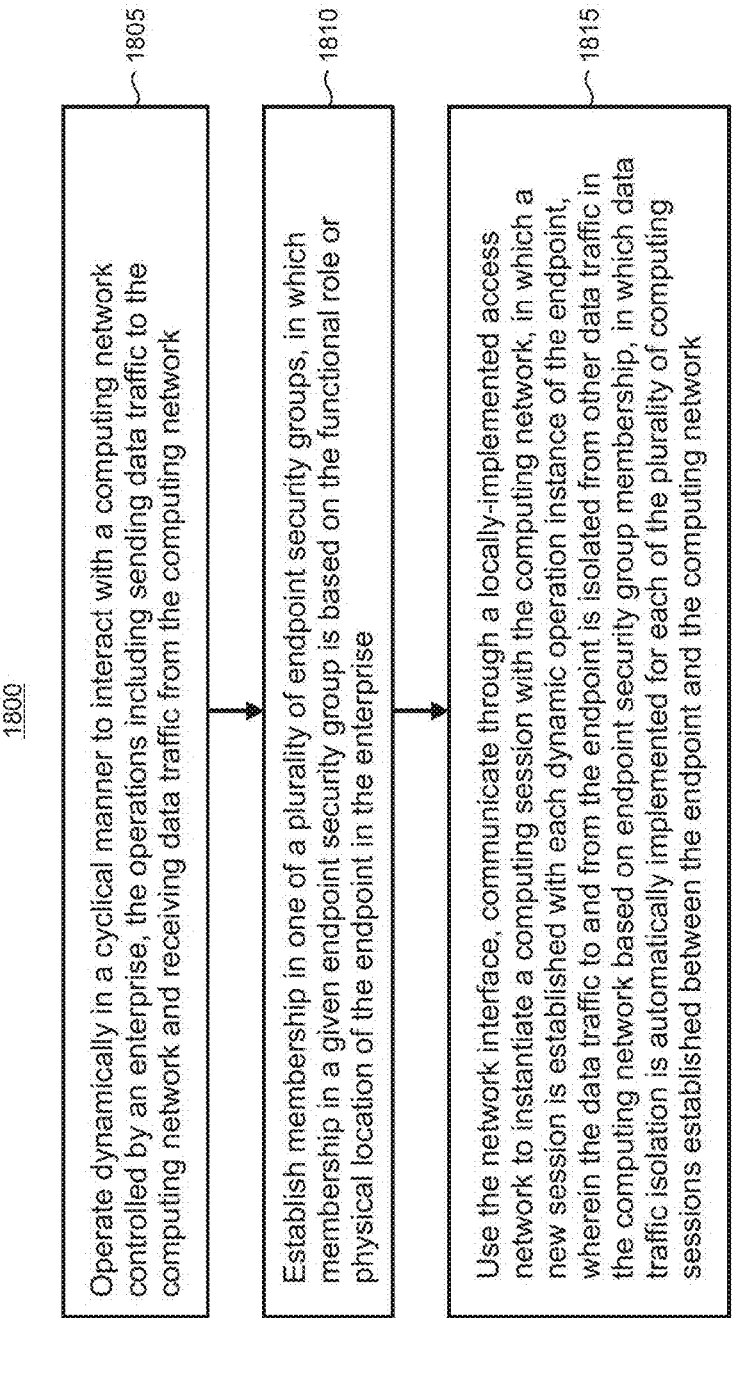

1800

1805

Operate dynamically in a cyclical manner to interact with a computing network controlled by an enterprise, the operations including sending data traffic to the computing network and receiving data traffic from the computing network

1810

Establish membership in one of a plurality of endpoint security groups, in which membership in a given endpoint security group is based on the functional role or physical location of the endpoint in the enterprise

1815

Use the network interface, communicate through a locally-implemented access network to instantiate a computing session with the computing network, in which a new session is established with each dynamic operation instance of the endpoint, wherein the data traffic to and from the endpoint is isolated from other data traffic in the computing network based on endpoint security group membership, in which data traffic isolation is automatically implemented for each of the plurality of computing sessions established between the endpoint and the computing network

1900

2000

2100

2200

ENDPOINT SECURITY GROUPS IN PRIVATE MULTI-ACCESS EDGE COMPUTE NETWORKS

BACKGROUND

Private multi-access edge compute (MEC) platforms are small-footprint extensions of cloud-computing networks and datacenters. Private MEC networks are typically placed in or near an enterprise network and are designed to run workloads and services that require high performance and low latency.

SUMMARY

Computing device endpoints hosting applications and having communication interfaces to a network are grouped into endpoint security groups in which endpoints in a given group commonly share features or characteristics including, for example, device type, capability and function, role, or location. The endpoint security groups function to identify the endpoints with the network for policy application and enforcement to provide an effective stand-in for conventional endpoint grouping using Internet Protocol (IP) addressing. Utilization of endpoint security groups for endpoint identity and policy definition enables policies to be automatically applied without the need for human operator intervention to explicitly allocate IP addresses in a consistent manner. Automated policy application is particularly advantageous when the device endpoints are configured as Internet-of-Things (IoT) devices, such as sensors, cameras, robotic systems, and the like, and utilized in large-scale deployments such as enterprise factory environments in which network access uses a multi-access model (e.g., via Wi-Fi, cellular, etc.). Endpoint security groups further facilitate centralized policy definition and automated application to endpoints independent of deployment scale, dynamic operating conditions, and type of network access to thereby minimize the cyber-attack surface while enabling fine-grained control over endpoint data traffic on the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 1 illustrates the interactions among functions supporting an enterprise manufacturing floor that operates within the current "Industry 4.0;"

FIGS. 13-18 are illustrative methods that are performed to implement one or more of the present principles for endpoint security groups in private MEC networks;

Like reference numerals indicate like elements in the drawings. Elements are not drawn to scale unless otherwise indicated.

DETAILED DESCRIPTION

Figure 2:
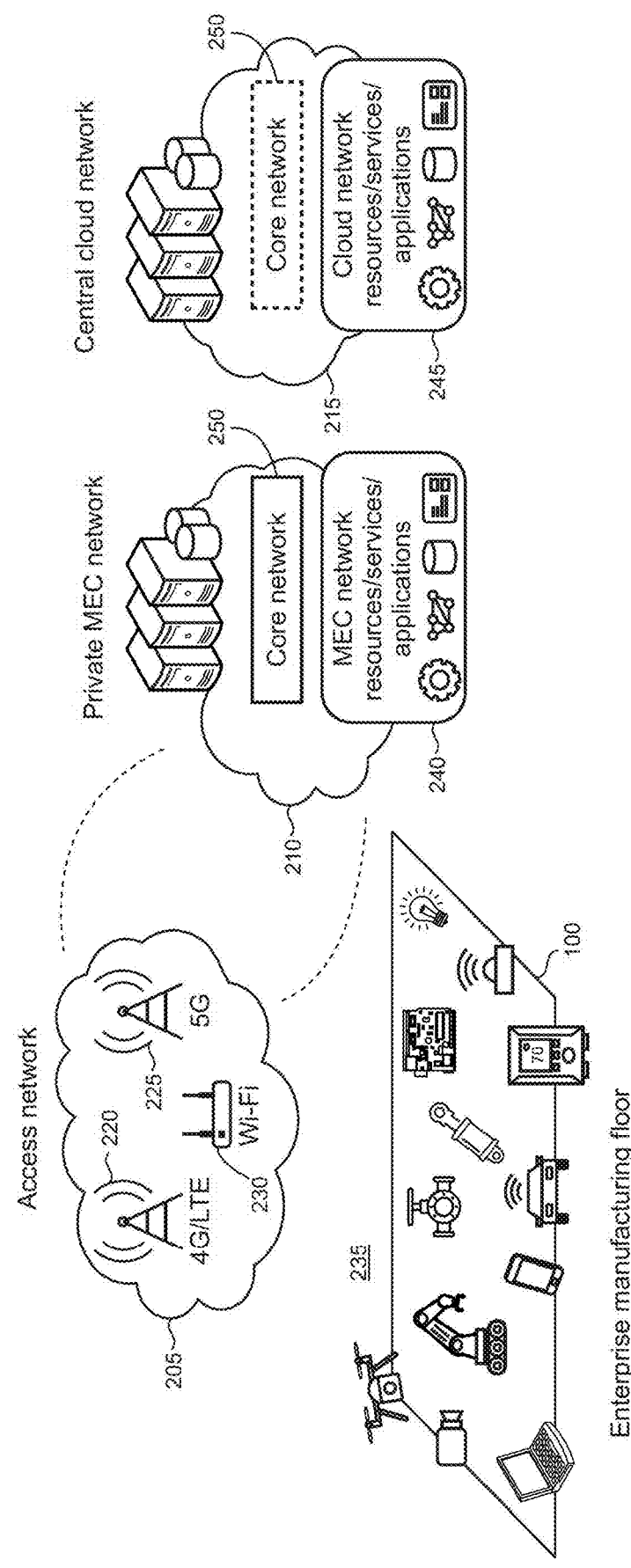
FIG. 2 shows an illustrative computing environment including an enterprise manufacturing floor, an access network, a private MEC network, and a central cloud network.

Significant changes are occurring in the way that products are manufactured today as a result of the current digital transformations that have given rise to what is termed "Industry 4.0" representing the fourth revolution in manufacturing. The first industrial revolution was driven by mechanization through water and steam power, the second by mass production in assembly lines using electricity, and the third by the widespread adoption of computers and automation. Industry 4.0 promises to build on the past industrial revolutions by increasing the productivity of workers and assets to produce higher quality goods, while increasing safety and security, for example, by the IoT devices deployed in autonomous systems assisted by cloud-based computing using private MEC networks. Such MEC networks are typically located in close physical proximity to manufacturing floors and industrial sites operated by an enterprise to enable high-performance services with low-latency using multi-modal access networks using, for example, wired (e.g., local area networks (LAN)) and wireless (e.g., Wi-Fi and $4^{th}$ and/or $5^{th}$ generation (4G/5G) cellular) technologies.

Traditionally, manufacturing environments were not digitized and had limited connectivity with enterprise networks and the Internet. Today, in Industry 4.0, enterprises are now commonly deploying a wide range of computing devices, including IoT devices, along with associated applications running or hosted in cloud-based datacenters and MEC networks. In a manufacturing context, the definition of IoT device is broad enough to include complex industrial robots and autonomous vehicles. IoT devices can also be defined to include those with a relatively small computing footprint such as sensors, actuators, switches, and the like. Many IoT devices have no externally-facing human-machine interface. When used collectively, frequently in large numbers and in combination with powerful cloud-based MEC solutions, IoT devices can have a large positive impact on the automation and optimization of today's manufacturing environment.

While promising significant benefits, the adoption of Industry 4.0 with its associated proliferation of networked computing devices presents challenges to manufacturers, enterprises, and other adopters. For example, employing network-connected IoT and other industrial devices can increase the cyberattack surface of an enterprise. Malicious actors can attempt to use the IoT devices as entry points to the network to launch attacks. Thus, enterprises look to MEC- and cloud-based platforms to provide secure networking for their devices to ensure compliance with all applicable security policies and practices.

FIG. 1 illustrates some of these challenges in the context of a manufacturing floor 100 that is operated by an enterprise. Security teams understand threats, vulnerabilities, and cyber-security, and define security and compliance policies that operate in the enterprise. Operational technology (OT) teams work with IT (information technology) teams who understand Internet protocol (IP) networks utilized to implement secure enterprise networks.

OT teams understand the industrial environment and appreciate that extending IT security to OT cannot implement changes to IT and security processes and guidance. For example, no new networking protocol definitions can be required that entail waiting for network vendors to include those definitions in their products. These common understandings can ensure industrial networks meet applicable company compliance, security posture, and assurance policies.

Computing devices are termed "endpoints" in the context of networked computing environments described herein. The term endpoint can refer to either a computing device, such as an IoT device, or its associated applications, or both, depending on context. Endpoints in manufacturing environments typically operate dynamically by joining, leaving, and rejoining the network repeatedly to meet production demands. In addition, enterprises may deploy multiple thousands of IoT device endpoints and scale the number of deployed endpoints up and down as needed.

Enterprise operators desire that the definition and application of policies to endpoints in a multi-access network environment be responsive to the dynamic nature of endpoint operations and the need for effective and efficient scaling. In addition, as endpoints are deployed in enterprises in increasingly large numbers and the networked computing environments extend to the cloud, the size of the attack surface to which cyber-attacks and malware are targeted has increased. Accordingly, within the enterprise context shown in FIG. 1, IT teams seek to implement effective policy enforcement to ensure compliance with network performance and other applicable requirements. Security teams look to policy enforcement to provide high resistance to malicious cyber-attacks. OT teams want policy frameworks to have sufficient scope and flexibility to be applied to endpoints on a fine-grained basis with minimal operator intervention.

The aforementioned challenges are addressed by the present endpoint security groups as part of a policy framework for securing and controlling endpoints on a large-scale basis by the application of centrally-defined policies. Endpoints characterized by commonly-shared features or characteristics are collected into separate and distinct endpoint security groups. Endpoint security group membership functions provide identity to the endpoints for the purposes of enterprise network policy enforcement.

Compared to conventional IP addressing which can be overwhelmed by the challenges presented in large-scale, dynamic, and multi-access device deployment scenarios, endpoint security groups divide up the endpoints by features or characteristics into a more manageable number to support a policy framework that meets the dynamicism and scaling requirements of endpoint and network deployment in an access-agnostic manner. Utilization of endpoint security groups provides for centralized policy definition and automated application to endpoints independent of deployment scale, dynamic operating conditions, and type of network access to thereby minimize cyber-attack surface while enabling fine-grained control over endpoint data traffic on the network.

In an illustrative embodiment, endpoint security groups are used with a multi-access edge compute (MEC) platform configured for managing security for a plurality of computing device endpoints that are operable in a networked computing environment such as that used in a factory setting. Endpoints are classified by functional capabilities defined by one or more of computing device type, role, function, or location (in any combination) and then associated with different endpoint security groups. For example, one endpoint security group includes video cameras on an assembly line interoperating with video analysis applications, a second endpoint security group includes telemetry devices installed on autonomous material handlers in a warehouse interoperating with location-tracking applications, and a third endpoint security group includes sensors located on the material handlers interoperating with guidance and safety applications.

Security policies controlling network access and utilization to govern the behavior of endpoint applications and devices are selected and enforced against individual endpoints according to their endpoint security group membership. The applicable security policies are enforced on the endpoint each time a computing session with the network is instantiated. This way, security policies are consistently and uniformly applied to the endpoint as it cyclically goes on and offline in the dynamic environment. Endpoint security groups are designed to interoperate with existing authentication processes and systems. Thus, while IP addresses are still conventionally assigned (for example, when applications open network connections), security policy enforcement on the endpoint is based on endpoint security group identity as a substitute for IP address-based identity.

Thus, IP addresses are not utilized in policy definition when using the present principles and the network operator or enterprise is not required to modify security policies each time an endpoint joins, leaves, or rejoins the networked computing environment. In use cases involving thousands or tens of thousands of endpoints, maintaining large and ever-changing security policies using conventional IP addressing schemes is not scalable and can result in operator errors and a decrease in network security.

In another illustrative embodiment, endpoint security groups are utilized to facilitate segmentation of endpoint data traffic on a fine-grained basis. The use of fine granularity, termed "micro-segmentation," enables specific policies and controls to be applied to individual data streams or workloads associated with an endpoint having membership in a given endpoint security group. Policies and controls can thus be applied to specific data traffic segments based on the classification parameters, such as device features and capabilities, that define a particular endpoint security group.

As with the illustrative security embodiment discussed above, the definition and application of policies to distinct segments of data traffic from endpoints and applications within the networked computing environment are not based on IP addresses for endpoint identity, nor do conventional subnets need to be employed to implement the data traffic segmentation. Instead, the endpoint security groups provide for an automated policy framework with which discrete data traffic segments on the network are handled with the desired fine-grained discrimination and tailored policy enforcement. Policies in the framework are automatically applied to the individualized segments of data traffic as endpoints are engaged in dynamic operations to join, leave, and rejoin the networked computing environment. Micro-segmented data traffic policy application also scales just as readily as security policy enforcement discussed above, by bypassing the limitations imposed by conventional IP addressing schemes.

Various different policies are applicable to micro-segmented data traffic to enable features and performance characteristics to meet particular implementation and application requirements. For example, micro-segmentation enables the application of network access and utilization privileges by workload, or other the micro-segment basis, and the application of different levels of quality of service (QOS) relating, for example, to bandwidth, latency, reliability, availability, etc., to individual data traffic streams. Micro-segmentation can further facilitate data traffic isolation and grouping which can increase security by containing cyber-attacks before they spread. Network monitoring, and maintenance and administration tasks are streamlined by shifting the focus away from IP addresses using the present endpoint security group paradigm to reduce the scope of the network footprint under management.

Application of policies can also improve network performance by fine-grained handling of the micro-segmented traffic because computing infrastructure is more efficiently utilized, for example, by matching network capabilities to workloads. The optimization of resource usage by micro-segmentation can reduce network congestion. Data traffic prioritization techniques can increase overall network performance and throughput by dynamically controlling traffic volume. The operation of critical applications and services can also be more readily supported using micro-segmentation enabled by endpoint security groups arranged in accordance with the present principles.

Turning again to the drawings, FIG. 2 shows an illustrative computing environment 200 including the enterprise manufacturing floor 100, an access network 205, a private MEC network 210, and a central cloud network 215. While a manufacturing environment is shown and described here to highlight principles of operation of the present endpoint security groups, such inventive principles are not limited to manufacturing. In some implementations the access network is operated by the enterprise, while in other implementations all or parts of the access network are operated as part of the MEC network as indicated by the dashed line.

The access network supports different wireless technologies and protocols including 4G/LTE (4th generation/long term evolution) cellular technologies 220, 5G (5th generation) cellular technologies 225, and Wi-Fi (i.e., IEEE 802.1x) 230. Conventional wired network access technologies and protocols (not shown) may also be supported by the access network in some cases.

The enterprise manufacturing floor 100 supports various computing devices referred to as "endpoints" herein, as indicated collectively by reference numeral 235. The present principles are applicable to a wide range of devices and may generally include, but are not limited to, user equipment (UE) such as smartphones, computers such as laptops, tablets, desktops and servers, and other types of computing devices that are suitable for use in a manufacturing environment. The endpoints more particularly include IoT devices that are typically utilized in relatively large numbers having a wide range of features and capabilities across a wide range of device types, functions, roles, and settings such as location and operating environment. The IoT devices may include, for example, sensors, monitors, actuators, trackers, scanners, controllers, industrial robots, automated guided vehicles, alarms, detectors, meters, automation devices, surveillance systems, access control systems, hazard detectors, telemetric devices, artificial intelligence (AI) devices, displays, lighting, radio-frequency identification (RFID) devices, inventory management devices, and the like, as appropriate to meet the needs of a given implementation of the present principles.

The MEC 210 and central cloud 215 networks each support various respective resources and services 240 and 245 that typically pertain to compute, network, and storage. Applications are also supported by the networks with which the endpoints 235 interact. It is noted that applications are typically executed in a distributed computing architecture in which both an endpoint and a network server respectively store and execute suitable instructions to implement a given application functionality and/or service. For example, a video camera on the manufacturing floor 100 interoperates with a video analysis application that is hosted in the private MEC network 210 and/or central cloud network 215. In scenarios in which the endpoints comprise IoT devices, such endpoints generally have relatively small computing footprints with processing, memory, and storage resources that are purposefully limited by design and often do not expose an externally-facing human-machine interface.

Figure 22:
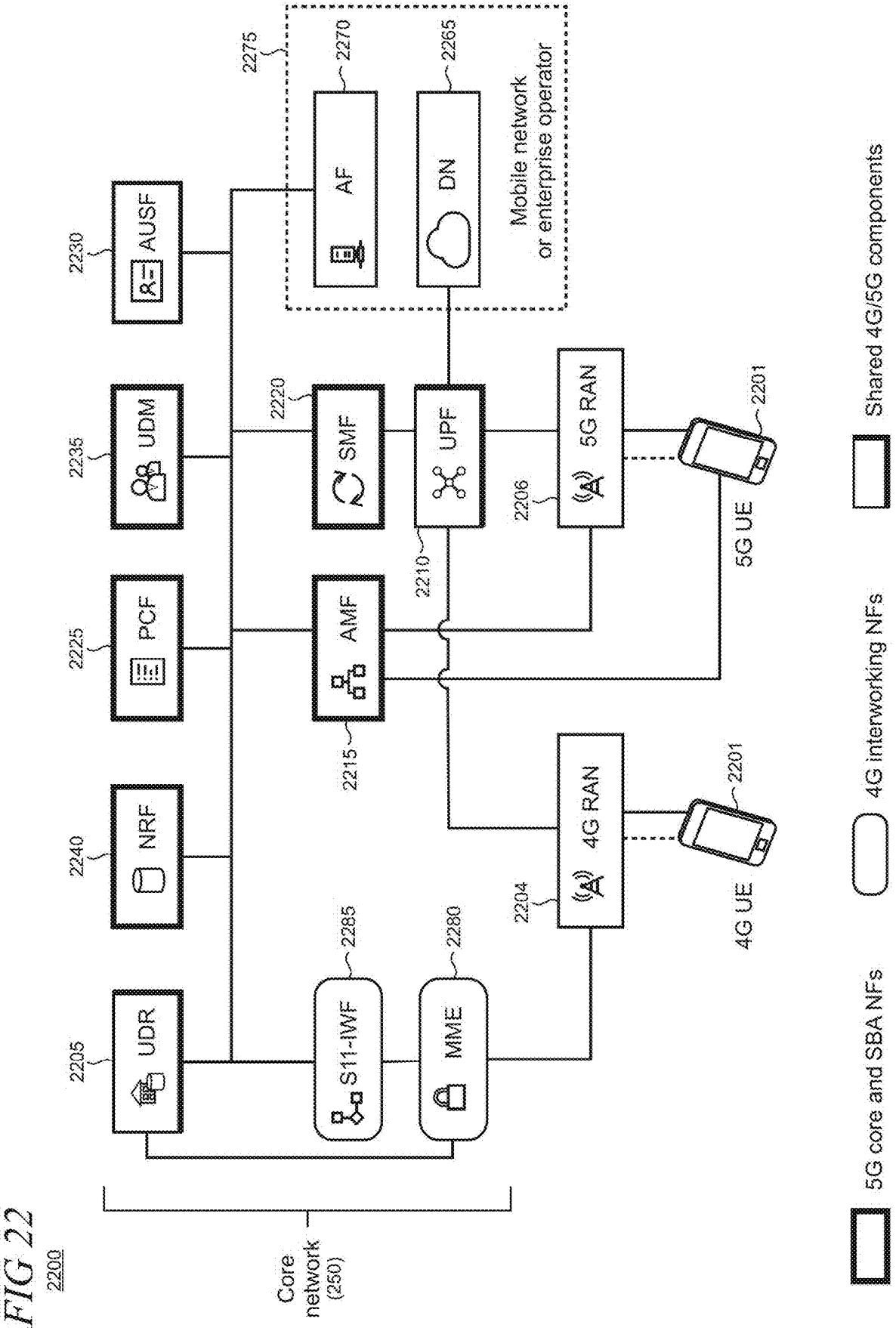
FIG. 22 shows details of an illustrative 4G/5G core network implemented using SDN (software-defined networking).

A mobile core network 250 is supported in the MEC network 210 in this illustrative embodiment. The core network is implemented using software-defined network (SDN) principles (details of an illustrative SDN-based core network are shown in FIG. 22 and described in the accompanying text). While the MEC network supports the core network, part or all of core network functionalities can be instantiated in the central cloud network 215 in some implementations, as indicated by the dashed lines. The SDN paradigm is inherently flexible to support a variety of functional splits between network elements and functions among the enterprise, MEC, and central cloud.

The MEC network 210 is configured in this illustrative example as a private network. This configuration is well adapted to enterprise environments in which all of the computing device endpoints 235 are owned and/or controlled by a single entity. The combination of access network 205, private MEC network 210, and central cloud network 215 makes it possible to create private wireless networks for the enterprise that are fast, highly secure, and scalable, and can leverage the cloud-based resources, services, and applications running at the far edge, in the cloud, or across hybrid locations comprising various parts of the enterprise, MEC, and/or central cloud.

While a private MEC is utilized in this particular illustrative example, it may be appreciated that the present principles associated with endpoint security groups are also adapted to public MEC networks in which endpoints owned by multiple parties and entities are operable in a multi-tenancy environment. Public MEC networks typically are not in close proximity and/or co-located with infrastructure supporting enterprise operations (e.g., manufacturing floor), but can still perform satisfactorily for some applications and benefit from the use of endpoint security groups for policy enforcement.

Figure 3:
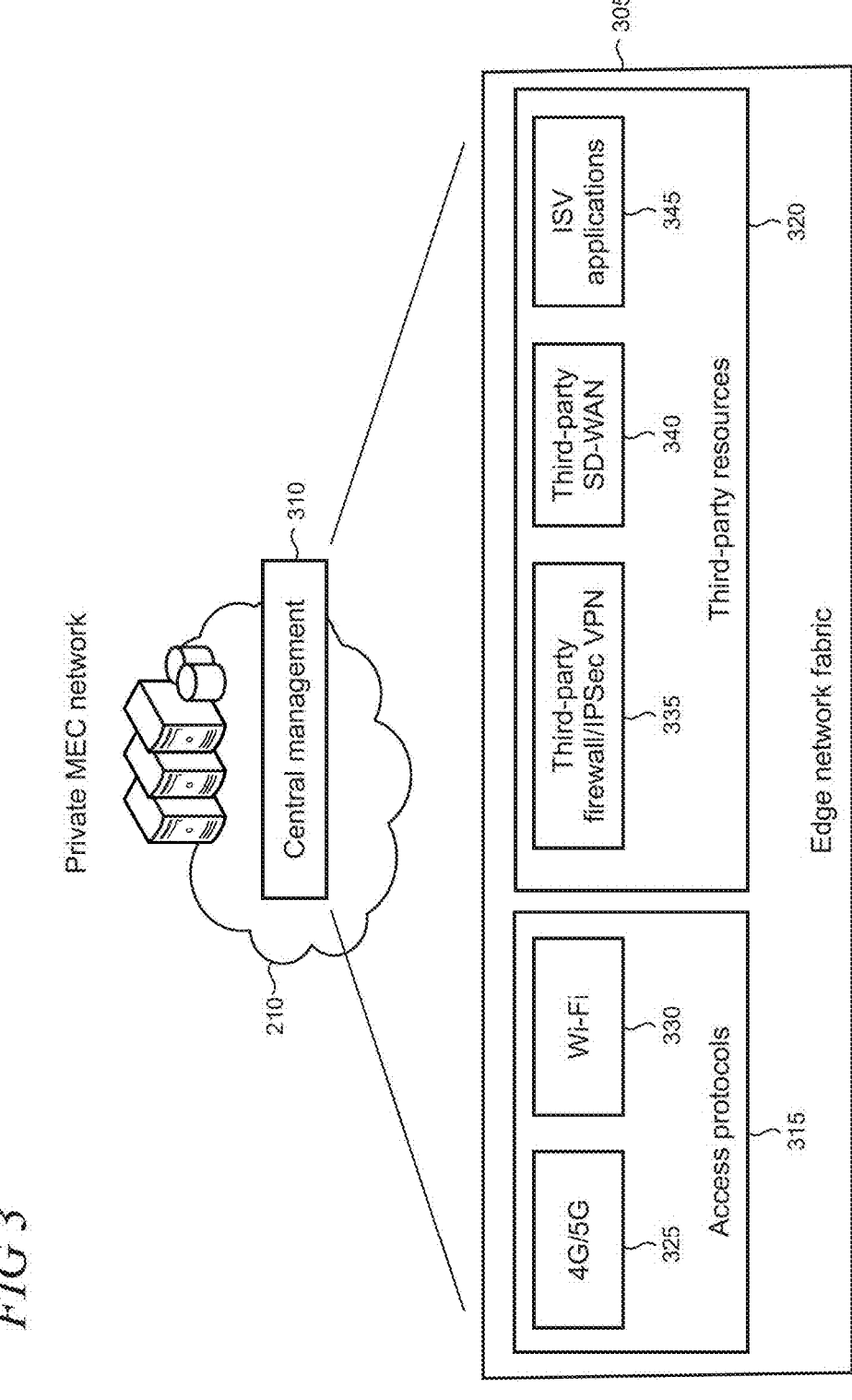
FIG. 3 shows an illustrative edge network fabric that supports various access technologies and computing applications.

FIG. 3 shows an illustrative edge network fabric 305 supported by the private MEC network 210. The edge network fabric is configured to provide a central management functionality 310 for various access protocols 315 and third-party resources, services, and computing applications (collectively referred to as third-party resources 320) that are available to endpoints in the enterprise in the private MEC network.

The managed components include, for example and without limitation, 4G and 5G wireless access 325, Wi-Fi access 330, and third-party-supported network services including firewalls and virtual private networks (VPNs) 335 using the IPSec security and authentication protocol for data transport. The edge network fabric manages third-party-supported software-defined wide area networks (SD-WANs) 340 and ISV (independent software vendor) applications 345.

Figure 4:
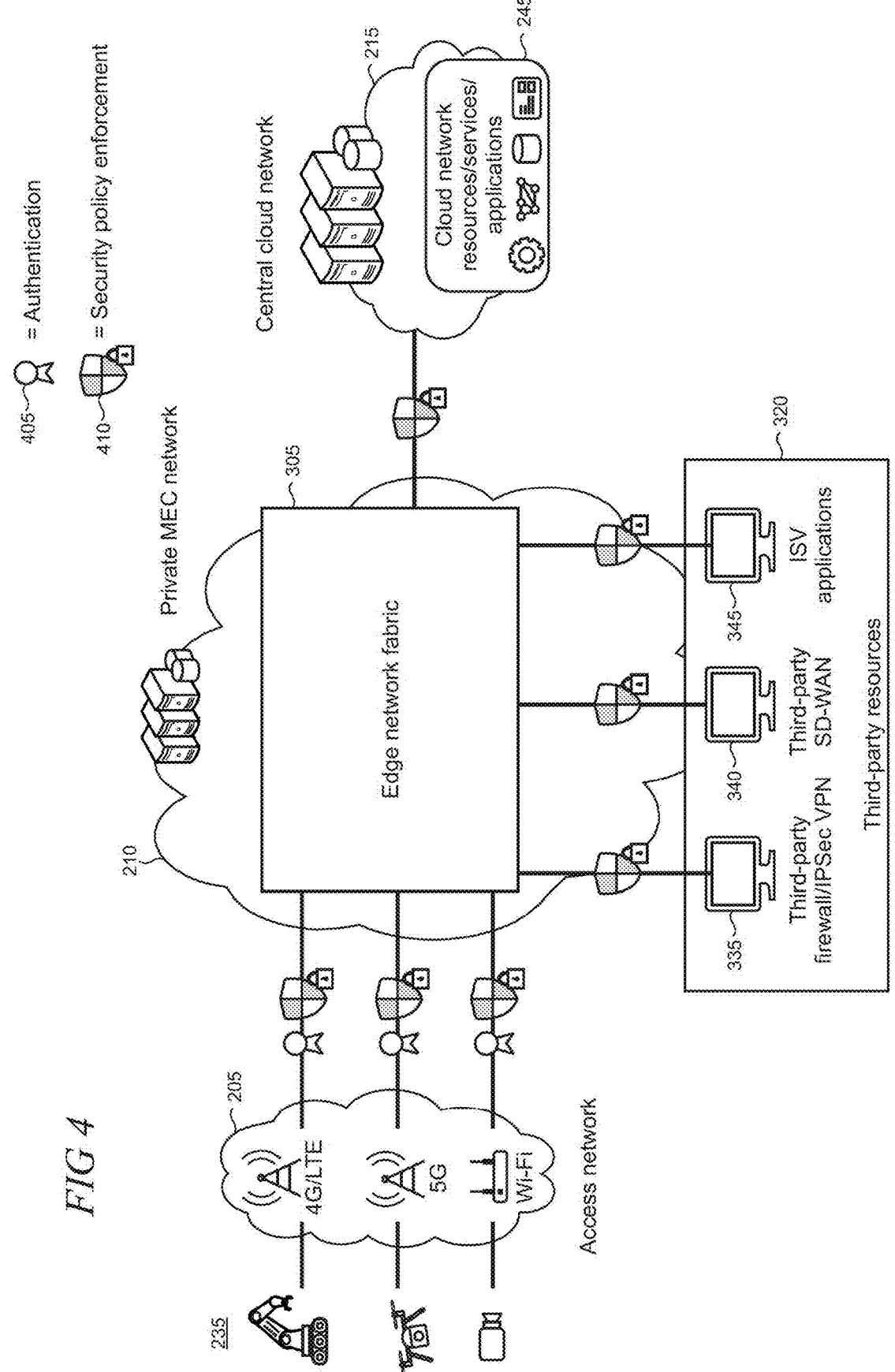
FIG. 4 shows an illustrative edge network fabric utilized to provide authentication and policy enforcement for computing device endpoints using different methods of network access.

FIG. 4 shows how the edge network fabric 305 is utilized to provide authentication and policy enforcement for computing device endpoints 235 using different protocols in the access network 205. As shown on the left side of the drawing, the endpoints are authenticated at the point of entry to the private MEC network 210 (authentication processes are represented by icons 405). Policy enforcement including, for example, security policies dealing with endpoint resource access and utilization are applied at the interfaces to the third-party resources 320 and resources 245 in the central cloud 215 (policy enforcement processes are represented by icons 410).

In alternative embodiments, authentication and/or security processes can be applied at other locations within the network and/or at different points of time in a given computing session. For example, security policies can be enforced or an endpoint can be required to re-authenticate when accessing a particularly sensitive portion of the network or interacting with an application at a particular time of day.

Figure 5:
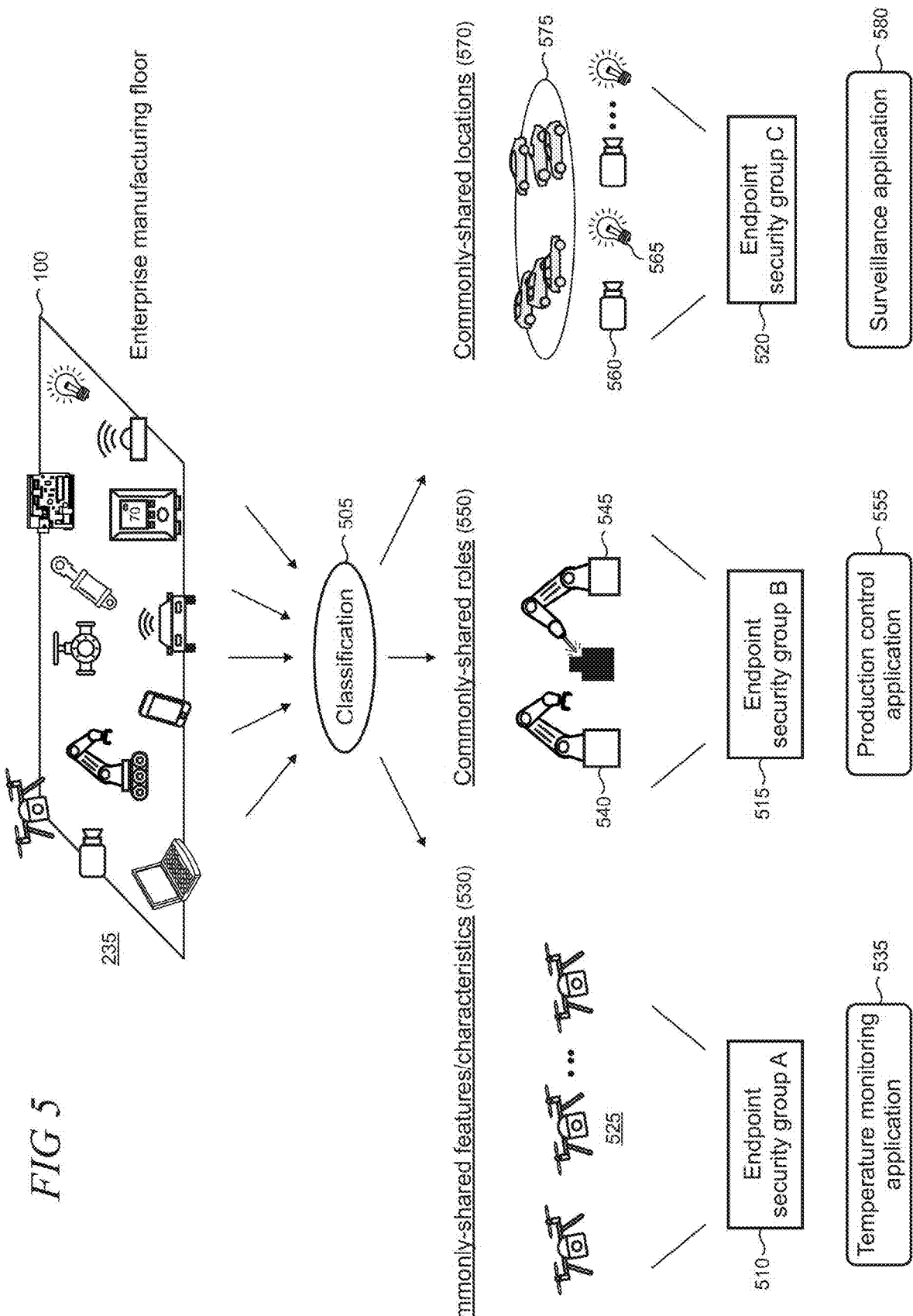
FIG. 5 shows illustrative classification criteria for grouping computing device endpoints into different endpoint security groups.

Endpoint security groups are instantiated based on classification methodology that focuses on commonly-shared features including but not limited to, device type, capability and function, role, or location, that are used as individual classification criterion or in combination. FIG. 5 shows an illustrative classification process 505 for grouping computing device endpoints 235 into different endpoint security groups A, B, and C, as respectively indicated by reference numerals 510, 515, and 520. It is emphasized that the showing of three endpoint security groups using the particular classification process criteria and endpoint types shown in the drawing is provided to highlight the features of the present principles. It may be appreciated that various different groupings may be utilized applying suitable criteria to particular endpoints of interest in appropriate numbers to meet the needs of a given implementation.

In this illustrative example, automated guided vehicles such as drones 525 are classified by commonly-shared features or characteristics 530 and placed in endpoint security group A. Features of interest for the drones in this particular embodiment may include, for example, capabilities for controlled and/or guided movements of a specified duration within a three-dimension space, and temperature sensing capabilities. Inclusion of the drones in the same endpoint security group facilitates network access to a cloud-hosted process temperature-monitoring application 535 in this illustrative example.

Membership in endpoint security group A might span different drone manufacturers and models, in this example, so long as the grouped drones have the required features or characteristics. If the endpoint security group classification criteria are broadened such that movements and monitoring are only required in a two-dimensional space (e.g., along the floor of a manufacturing space), then wheeled vehicles with temperature monitoring satisfy the applicable classification criteria and could be included in the endpoint security group with the drones, for example.

It may be appreciated that classification criteria may be relatively narrow or broad to classify endpoints into particular endpoint security groups, as required to meet applicable goals. The present principles for endpoint security groups can be flexibly applied to a variety of implementations so that identically-specified endpoints may be required for inclusion in some groups, while other groups do not necessarily need such identicalness so long as there is a sufficient overlap of target characteristics.

Continuing with the illustrative embodiment shown in FIG. 5, industrial robots 540 and 545 are classified into endpoint security group B according to commonly-shared roles 550. In this example, the robots have different functions-one is a pick and place robot and the other is a robotic welder. However, the two robots share a common role as automated assembly-line machines. Enterprise security policies are therefore applied to provide the robots with the same access privileges to resources, services, and applications in the MEC or central cloud networks. For example, as the robots operate cooperatively when working on the assembly-line, the machines might need to interact with the same production control application 555 or other resources to ensure proper and effective assembly-line operations.

In another illustrative example, video surveillance cameras 560 and infrared (IR) lighting fixtures 565 are classified into endpoint security group C according to commonly-shared locations 570. The cameras and lights have different functions and capabilities but, in this example, are deployed in the same parking lot location 575 and are commonly connected to a surveillance application 580 that is operable in the enterprise.

Figure 6:
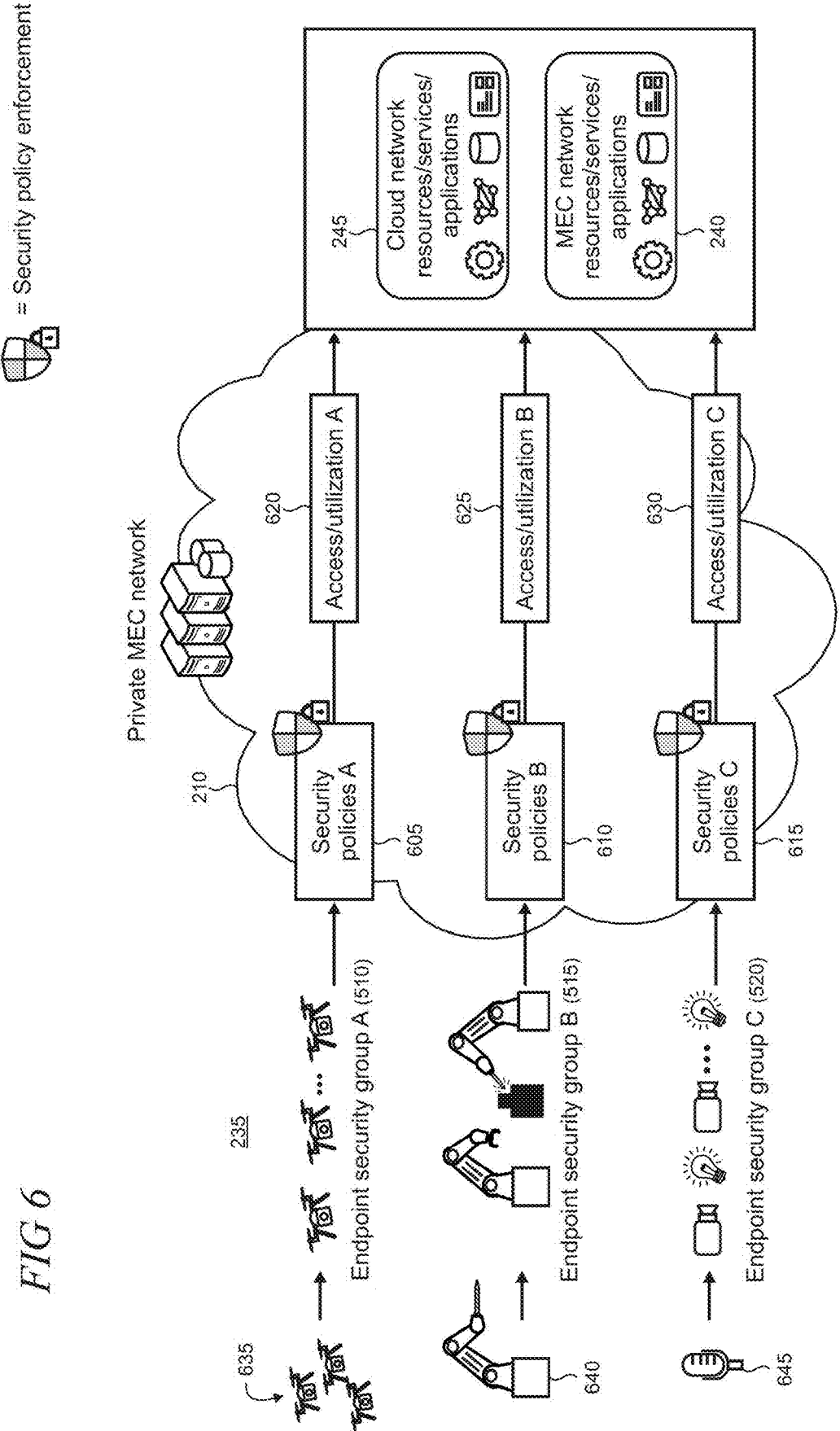
FIG. 6 shows an illustrative application of different security policies to different endpoint security groups when accessing cloud-based services and resources.

FIG. 6 shows that different security policies 605, 610, and 615 are enforced on endpoints 235 based on their grouping into respective endpoint security groups 510, 515, and 520 to control the access and utilization of cloud-based services and resources 240 and 245. Specific policy definitions can thus vary by endpoint security group to provide the enterprise operator with a flexibly-applied framework. Accordingly, the network access and utilization A (indicated by reference numeral 620 in the drawings) by endpoint security group A can vary from access/utilization B (625) and access/utilization C (630) for the other groups through the enforcement of respective security policies as appropriate to meet applicable requirements.

The policy definition framework for security is also readily scalable. For example, when new drone endpoints 635 come online, security policies A are automatically applied to control their network access and utilization. The enterprise operator does not need to redefine or adjust the security policy framework in any way to accommodate the new endpoints and human-manual intervention is not needed to implement the scaling. Similarly, when an industrial robotic drill 640 comes online to the assembly-line, it is identified as sharing a common production role with other robots on the assembly-line and automatically joined into endpoint security group B. Security policies B are automatically enforced on the drill without the need for modifications or configuration changes to the security policy framework and definitions. When a microphone 645 comes online to the parking lot 575, it joins the cameras and IR lighting in endpoint security group C by virtue of its commonly-shared parking lot location.

Figure 7:
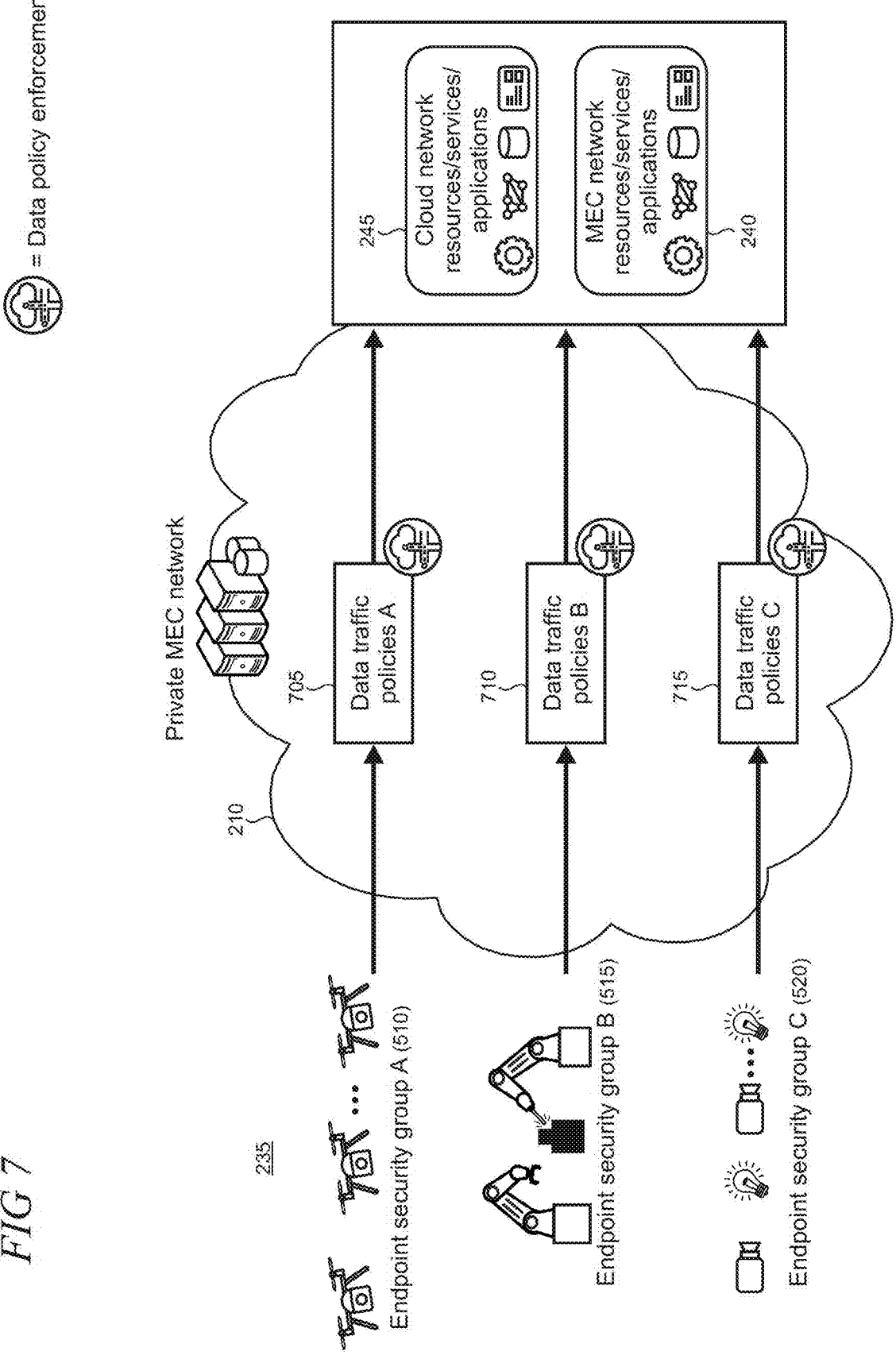
FIG. 7 shows illustrative applications of different data traffic policies to different endpoint security groups for data traffic in a networked computing environment including private MEC and/or cloud networks.

The present endpoint security groups and their interoperation with a private MEC network facilitate the enforcement of data traffic policies in an enterprise. FIG. 7 shows an illustrative application of different sets of data traffic policies A, B, and C (respectively indicated by reference numerals 705, 710, and 715 in the drawing) to data traffic associated with different endpoint security groups A, B, and C. In a similar manner to the enforcement of security policies discussed above, data traffic policy enforcement can vary by endpoint security group to handle individual data streams and endpoint workloads in the networked computing environment including the cloud-based services and resources 240 and 245.

Figure 8:
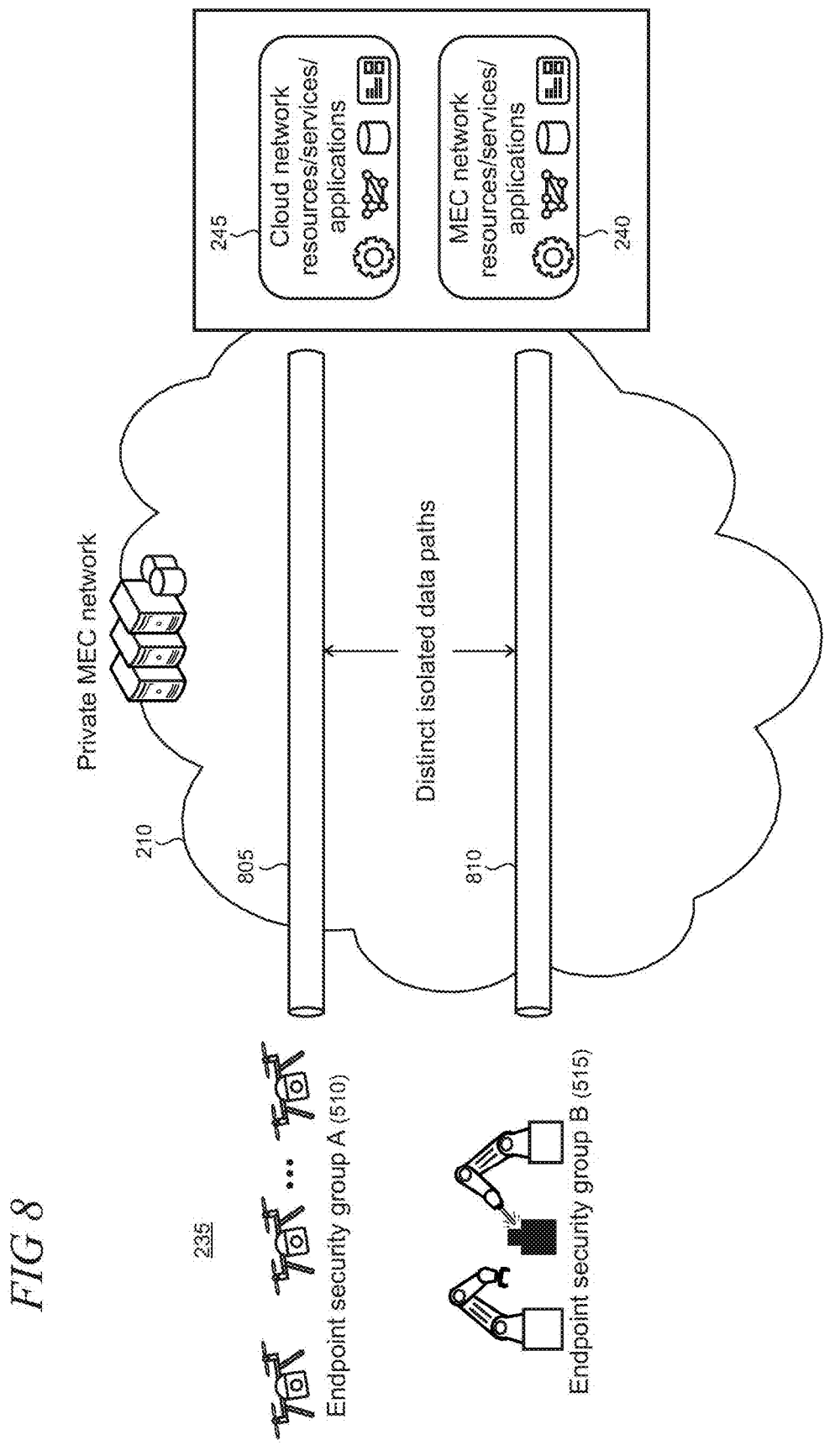
FIG. 8 shows illustrative diverse or isolated data paths applied to data traffic from endpoints in endpoint security groups on a micro-segmented basis.

A principal use case for traffic policies is the implementation of fine-grained data traffic segmentation, or "micro-segmentation" in an enterprise. Data traffic segmentation provides for isolated data paths 805 and 810 through the MEC network 210, as illustratively shown in FIG. 8, to discriminate among individual data streams and workloads associated with endpoints 235 in the respective endpoint security groups. As shown, data path 805 is utilized for endpoints in endpoint security group A while data path 810 is utilized for endpoint security group B.

The data paths 805 and 810 utilized for data traffic segmentation are alternatively logically-implemented or physically-implemented or using a combination of such implementations. A logical implementation may be considered in a similar context as virtually-instantiated networks and/or subnets but without using an endpoint identity address space which relies on IP addresses. The isolated data paths for segmented data traffic can be implemented in flexible topologies to enhance network operation efficiency and reduce management overhead. Physically-implemented data paths include, for example, the use of dedicated network infrastructure which may be warranted in scenarios in which enhanced performance, reliability, resource availability, and/or security is needed.

A complementary paradigm to traffic isolation is traffic consolidation which is also facilitated by the present endpoint security groups. Data traffic in the enterprise is identified based on endpoint security group membership and then handled in a consolidated data stream. Endpoints in different security groups can be authenticated and provided with access to resources and applications according to individually applied policies, as discussed above, and where endpoint data traffic is consolidated for purposes of transport over a common connection. For example, endpoint security groups A and B are subject to different security policies but data traffic for both groups is carried over a common high bandwidth/low latency connection.

Figure 9:
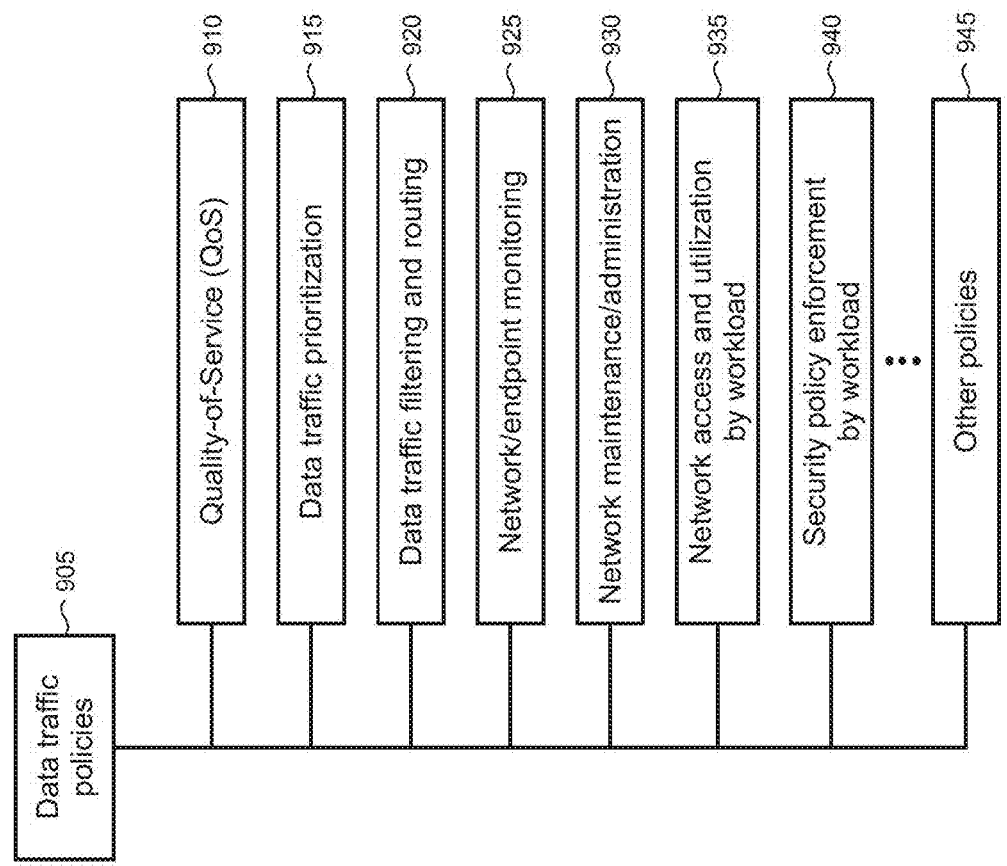
FIG. 9 shows an illustrative taxonomy of data traffic policies.

FIG. 9 shows a taxonomy 900 of exemplary data traffic policies that may be applied to segmented data traffic and/or endpoint workload individually or in various combinations as appropriate for given use cases. As shown, exemplary data traffic policies 905 pertain to, for example and without limitation: quality of service (QOS) 910; data traffic prioritization 915; data traffic filtering and/or routing 920; network/endpoint monitoring 925; network maintenance/administration 930; network access and utilization by workload 935; security policy enforcement by workload 940, and other suitable policies 945 as may be required to meet the needs of a given implementation of the present principles.

Figure 10:
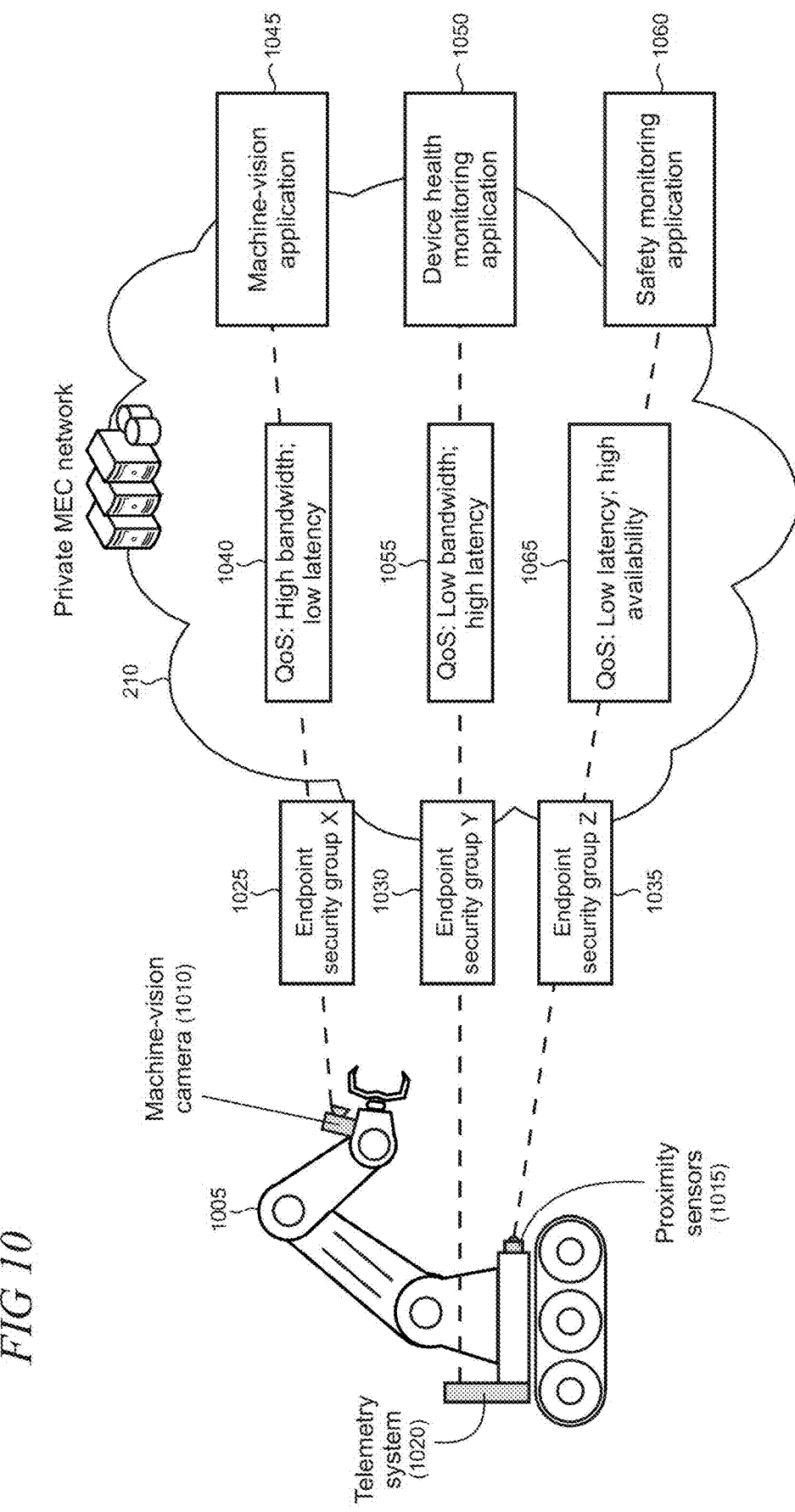
FIG. 10 shows an illustrative embodiment of an endpoint for which data traffic micro-segmentation is applied.

FIG. 10 shows an illustrative embodiment of endpoints for which data traffic micro-segmentation is applied on the basis of QoS. This illustrative example shows how segmentation can be applied to individual IoT device endpoints that are integrated into a single machine, in this case, an industrial robot 1005. The robot uses a machine-vision camera 1010, proximity sensors 1015, and telemetry system 1020. These individual components are separately grouped by function into different endpoint security groups X, Y, and Z (respectively indicated by reference numerals 1025, 1030, and 1035) in accordance with the present principles.

The machine-vision camera 1010 produces data traffic that is segmented, by virtue of membership in endpoint security group X, for transport over a high bandwidth and low latency network connection 1040 to the MEC network 210 to a cloud-hosted machine-vision application 1045. The machine-vision application analyzes video data produced by the camera with high resolution on a real-time basis and the connection 1040 is well adapted to these operating requirements.

By contrast, the telemetry system 1020 and a robot health data monitoring application 1050 deal with device state data (e.g., battery charge level, electric motor temperatures, etc.) that need relatively low bandwidth and which can deal with high latency. Accordingly, telemetry data traffic is handled over a low bandwidth and high latency connection 1055 to the MEC network.

The proximity sensors 1015 interoperate with a cloud-hosted safety monitoring application 1060. As the safety monitoring is a critical function on the manufacturing floor, the data traffic associated with endpoint security group Z is handled over a low latency and high availability connection 1065.

Figure 11:
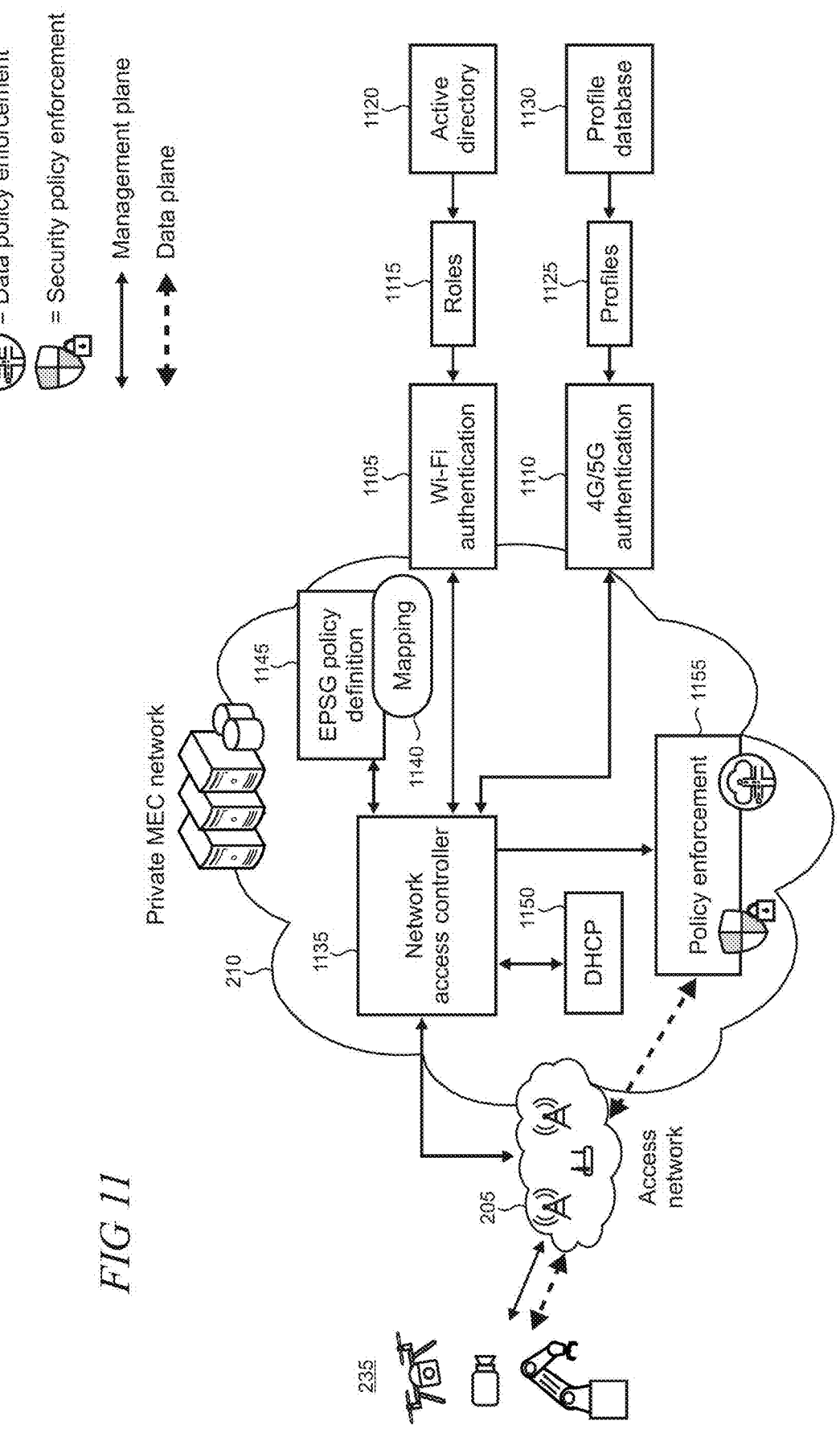
FIG. 11 shows an illustrative implementation of endpoint security groups that is adapted to interface with existing wireless authentication protocols.

The present endpoint security groups are advantageously interoperable with existing network processes and functions. FIG. 11 shows an illustrative implementation of endpoint security groups that is adapted to interface with existing wireless authentication protocols. These protocols include, for example, Wi-Fi authentication 1105 and 4G/5G authentication 1110.

The Wi-Fi authentication process 1105 uses role-based access control (RBAC) authentication methods and may be implemented, for example, using protocols exposed by a RADIUS (remote authentication dial-in user service) server (not shown). Accordingly, the Wi-Fi authentication process receives roles 1115 from a suitable database such as an active directory 1120. Cellular authentication in 4G/5G systems can also use RBAC authentication methods. The 4G/5G authentication process 1110 receives profiles 1125 from a suitable profile database 1130 (network functions supporting authentication in a mixed 4G/5G SDN-based mobile network are shown in FIG. 22 and described in the accompanying text below).

Endpoints 235 provide identifying information over the access network 205 to a network access controller 1135 using, for example, extensible authentication protocol (EAP) data or using another suitable process. The network access controller uses the identifying information to obtain appropriate roles and profiles for the endpoints from the authentication processes.

As indicated by reference numeral 1140, an endpoint security group policy definition component 1145 maps endpoint security group membership to the roles and profiles using the classifying processes described above. The component 1145 further determines appropriate policies (e.g., security and data traffic enforcement policies) to be applied to the endpoints 235 in the endpoint security groups.

The roles and profiles are also used by the network access controller 1135 to interoperate with DHCP (dynamic host configuration protocol) server 1150 to assign IP addresses to the endpoints 235 using conventional processes. However, as discussed above, the assigned IP addresses are not utilized to instantiate endpoint security groups.

Information for endpoint security group memberships established from the role/profile mapping and associated policies is provided from the endpoint security group policy definition component 1145 to a policy enforcement component 1155 that is implemented using the edge network fabric (described in the text accompanying FIG. 3). As shown in the drawing, the policy enforcement is performed in a separate process that is independent from the IP addressing using the DHCP server 1150. The policy enforcement component enforces the policies on the endpoints 235, as discussed above.

Figure 12:
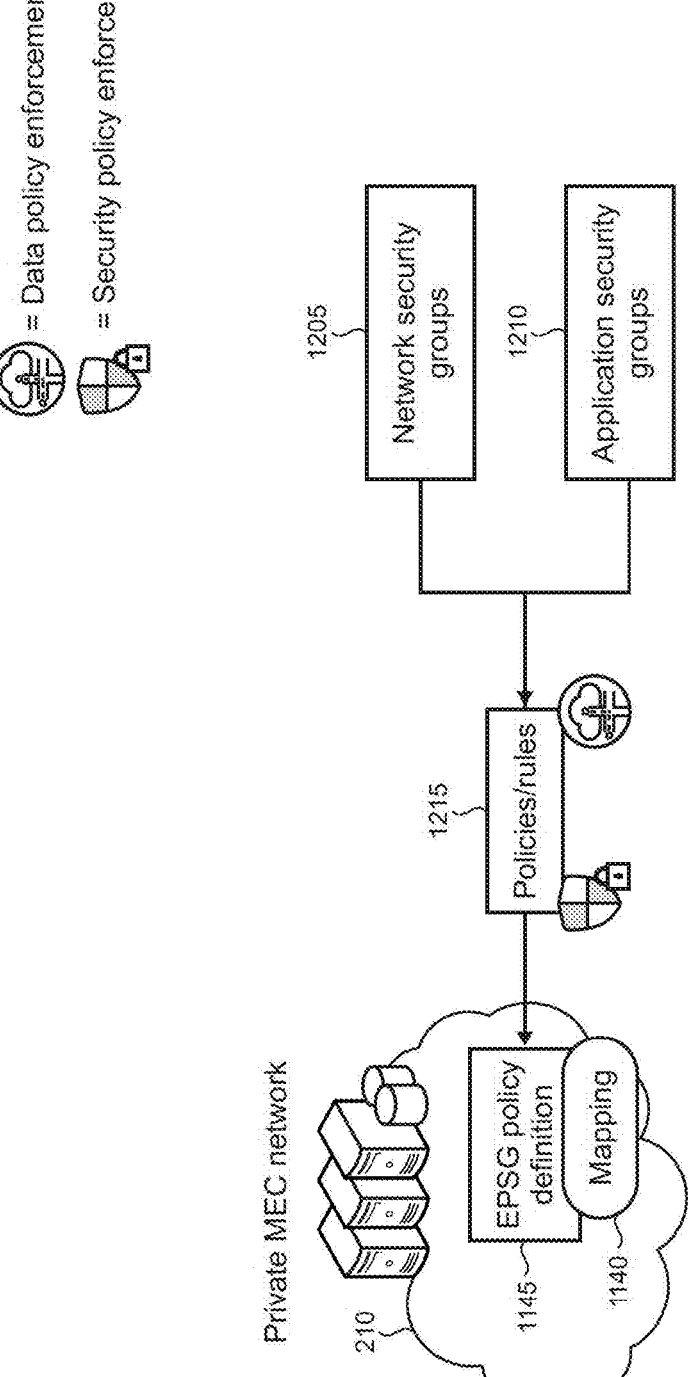
FIG. 12 shows an illustrative embodiment in which endpoint security group definitions are supported by application security groups and/or network security groups.

Endpoint security groups arranged in accordance with the present principles are also interoperable with existing security functions including network security groups 1205 and application security groups 1210, as shown in FIG. 12. The network and application security groups provide additional policies and rules 1215 (e.g., security rules) that inform the endpoint security group policy definition component 1145 when performing the mapping 1140 discussed above. Network security groups typically apply security rules to allow or deny inbound network traffic to, or outbound network traffic from, the cloud-based resources shown in FIG. 2 and described in the accompanying text. Application security groups are typically object references within a network security group to apply the security rules to specific workloads.

FIG. 13 is a flowchart of an illustrative method 1300 which uses a multi-access edge compute (MEC) platform for managing security for a plurality of computing device endpoints operable in a networked computing environment. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1305 includes communicating with the endpoints from a computing server in the MEC platform, in which the endpoints are dynamically operable to join, leave, and rejoin the networked computing environment through an access network supporting multiple different access protocols. Block 1310 includes classifying the endpoints based on functional capabilities of the endpoints defined by one or more of computing device type, role, function, or location.

Block 1315 includes associating the endpoints according to the classification by functional capabilities with different endpoint security groups. Block 1320 includes applying security policies to the endpoints based on their association with the different endpoint security groups, in which different IP (internet-protocol) addresses are assigned to network connections utilized by endpoints upon each instance of joining or rejoining the networked computing environment, in which the security policies are applied to the endpoints independent of the assigned IP addresses. Block 1325 includes, independently of the assigned IP addresses, automatically reapplying the security policies to endpoints upon rejoining the networked computing environment subsequent to leaving the networked computing environment.

FIG. 14 is a flowchart of an illustrative method 1400 performed by a computer server that may be located, for example, in a MEC network datacenter. Block 1405 includes receiving requests through an access network from a plurality of Internet-of-Things (IoT) endpoints to join an enterprise computing environment, in which the access network supports multiple different access protocols. Block 1410 includes authenticating the IoT endpoints using an authentication process, the authentication process being dependent on the access protocol used by the IoT endpoints.

Block 1415 includes, in response to the requests, assigning membership of the IoT endpoints to endpoint security groups, in which a plurality of different endpoint security groups is utilized and membership of the IoT endpoints in the endpoint security groups is based on features and functions supported by the IoT endpoints. Block 1420 includes enforcing security policies on the IoT endpoints based on endpoint security group membership, the enforcement of the security policies being independent from the access protocol used by the IoT endpoints.

FIG. 15 is a flowchart of an illustrative method 1500 performed by a computing device endpoint. Block 1505 includes operating dynamically in a cyclical manner to interact with a computing network controlled by an enterprise, the operations of the endpoint being based on a functional role or physical location of the endpoint in the enterprise. Block 1510 includes establishing membership in one or a plurality of endpoint security groups, in which membership in a given endpoint security group is based on the functional role or physical location of the endpoint in the enterprise. Block 1515 includes using the network interface, communicating through a locally-implemented access network to instantiate a computing session with the computing network, in which a new session is established with each instance of operation of the endpoint, and wherein the interactions of the endpoint with the computing network are controlled according to policies enforced on the endpoint based on endpoint security group membership, in which the policies are consistently enforced during each of a plurality of computing sessions established between the endpoint and the computing network.

FIG. 16 is a flowchart of an illustrative method 1600 which uses a multi-access edge compute (MEC) platform for segmenting data traffic associated with a plurality of computing device endpoints operable in a networked computing environment. Block 1605 includes communicating with the endpoints from a computing server in the MEC platform, in which the endpoints are dynamically operable to join, leave, and rejoin the networked computing environment through an access network supporting multiple different access protocols. Block 1610 includes classifying the endpoints based on functional capabilities of the endpoints defined by one or more of computing device type, role, function, or location.

Block 1615 includes associating the endpoints according to the classification by functional capabilities with different endpoint security groups. Block 1620 includes segmenting data traffic to and from endpoints in the networked computing environment based on endpoint membership in the endpoint security groups. Block 1625 includes applying different policies to respective different data traffic segments for the endpoints.

FIG. 17 is a flowchart of an illustrative method 1700 performed by a computer server that may be located, for example, in a MEC network datacenter. Block 1705 includes receiving requests through an access network from a plurality of Internet-of-Things (IoT) endpoints to join an enterprise computing environment, in which the access network supports multiple different access protocols. Block 1710 includes, in response to the requests, authenticating the IoT endpoints using an authentication process, the authentication process being dependent on the access protocol used by the IoT endpoints.

Block 1715 includes, subject to successful authentication, associating the IoT endpoints to endpoint security groups, in which a plurality of different endpoint security groups is utilized and the association of the IoT endpoints to the endpoint security groups is based on features and functionalities specific to the IoT endpoints and physical locations within an area served by the access network specific to the IoT endpoints. Block 1720 includes applying micro-segmentation to data traffic of authenticated IoT endpoints based on endpoint security group association. Block 1725 includes applying individual policies to each micro-segment of the micro-segmented data traffic.

FIG. 18 is a flowchart of an illustrative method 1800 performed by a computing device endpoint. Block 1805 includes operating dynamically in a cyclical manner to interact with a computing network controlled by an enterprise, the operations including sending data traffic to the computing network and receiving data traffic from the computing network. Block 1810 includes establishing membership in one of a plurality of endpoint security groups, in which membership in a given endpoint security group is based on the functional role or physical location of the endpoint in the enterprise.

Block 1815 includes, using the network interface, communicating through a locally-implemented access network to instantiate a computing session with the computing network, in which a new session is established with each dynamic operation instance of the endpoint, wherein the data traffic to and from the endpoint is isolated from other data traffic in the computing network based on endpoint security group membership, in which data traffic isolation is automatically implemented for each of the plurality of computing sessions established between the endpoint and the computing network.

Figure 19:
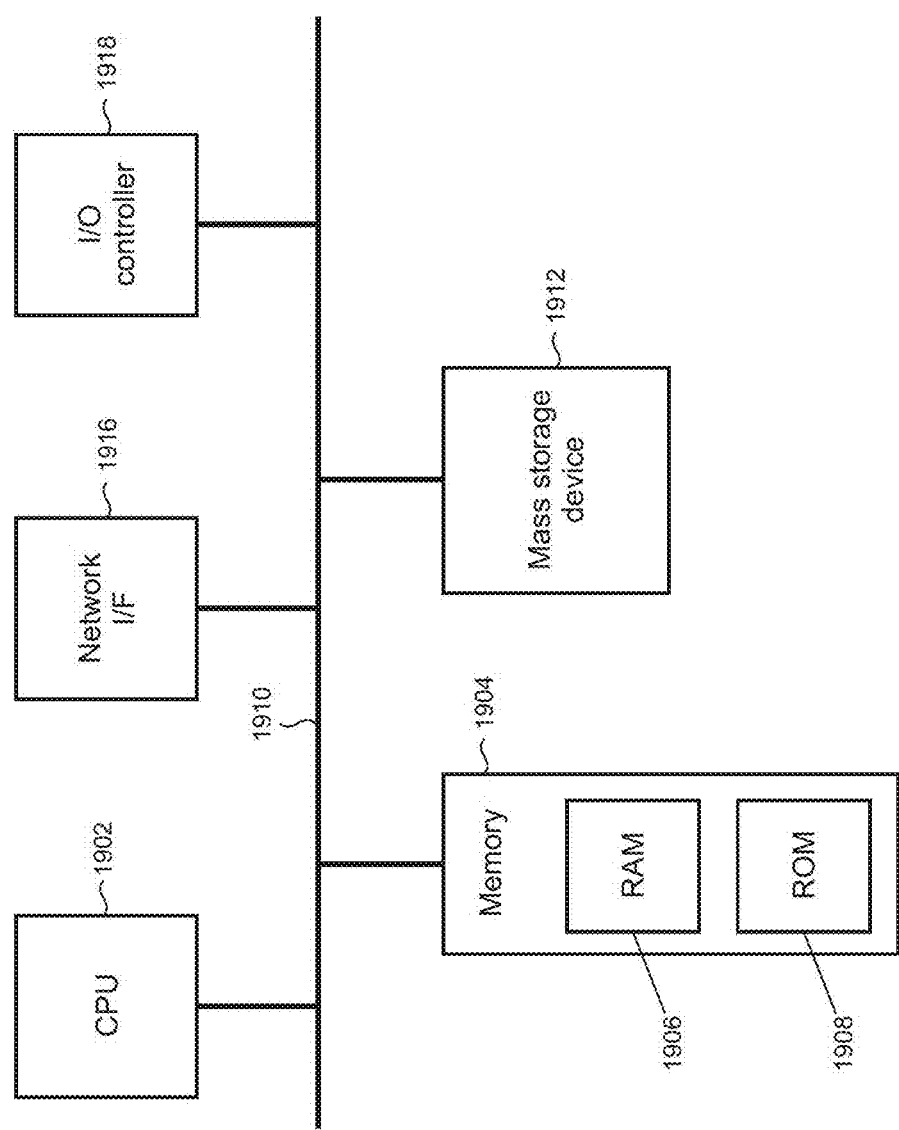
FIG. 19 is a block diagram of an illustrative server or computing device that may be used at least in part to implement the present endpoint security groups in private MEC networks.

FIG. 19 shows an illustrative architecture 1900 for a computing device, such as a server, capable of executing the various components described herein for endpoint security groups in private MEC networks. The architecture 1900 illustrated in FIG. 19 includes one or more processors 1902 (e.g., central processing unit, dedicated AI chip, graphics processing unit, etc.), a system memory 1904, including RAM (random access memory) 1906 and ROM (read only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein may also transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
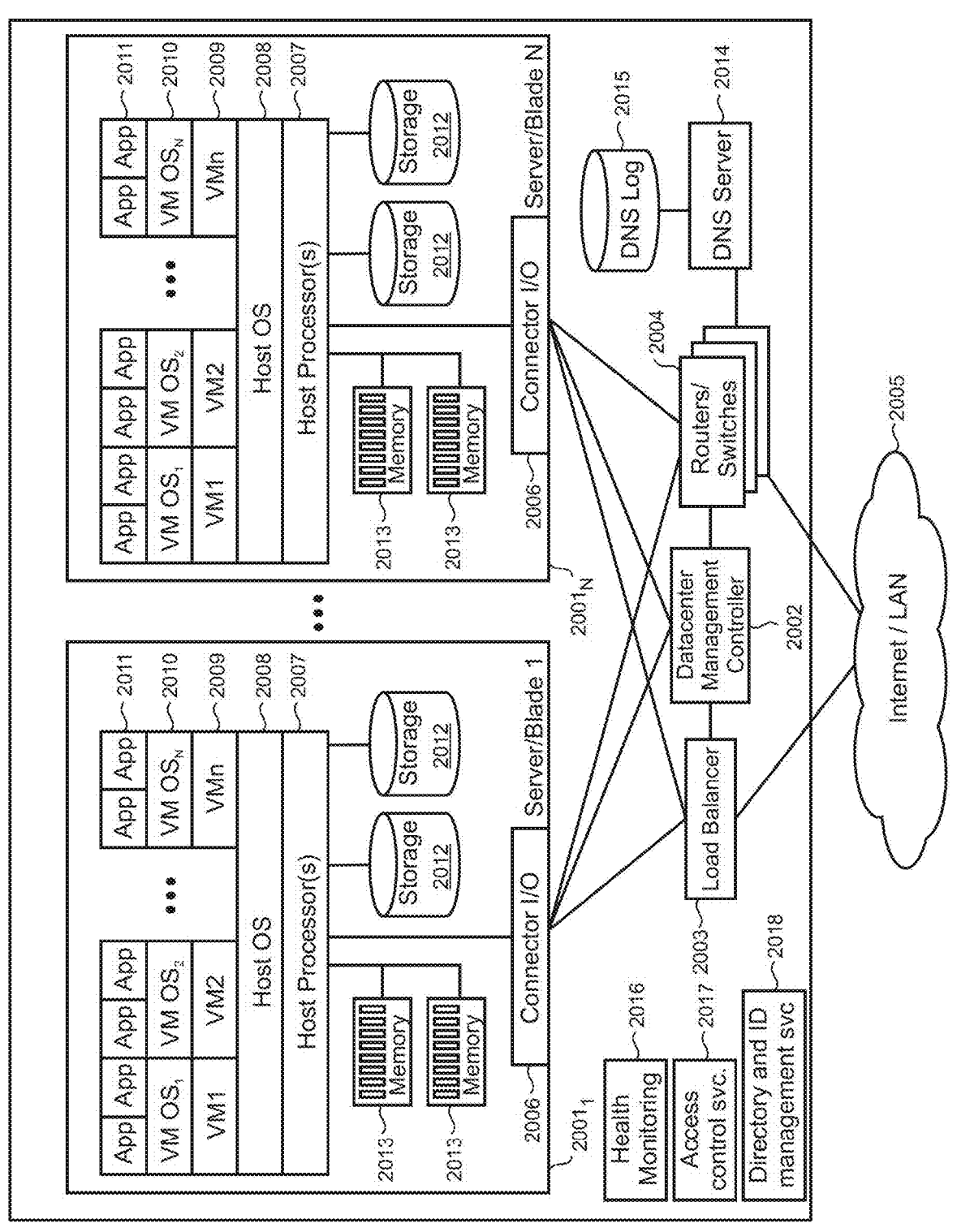
FIG. 20 is a block diagram of an illustrative datacenter that may be used at least in part to implement the endpoint security groups in private MEC networks.

FIG. 20 is a high-level block diagram of an illustrative datacenter 2000 that provides cloud computing services or distributed computing services that may be used to implement aspects of the present endpoint security groups in private MEC networks. Datacenter 2000 may incorporate one or more of the features disclosed in the DCs shown in the drawings and disclosed in the accompanying text. A plurality of servers 2001 are managed by datacenter management controller 2002. Load balancer 2003 distributes requests and computing workloads over servers 2001 to avoid a situation wherein a single server may become overwhelmed. Load balancer 2003 maximizes available capacity and performance of the resources in datacenter 2000. Routers/switches 2004 support data traffic between servers 2001 and between datacenter 2000 and external resources and users (not shown) via an external network 2005, which may be, for example, a local area network (LAN) or the Internet.

Servers 2001 may be standalone computing devices, and/or they may be configured as individual blades in a rack of one or more server devices. Servers 2001 have an input/output (I/O) connector 2006 that manages communication with other database entities. One or more host processors 2007 on each server 2001 run a host operating system (OS) 2008 that supports multiple virtual machines (VM) 2009. Each VM 2009 may run its own OS so that each VM OS 2010 on a server is different, or the same, or a mix of both. The VM OSs 2010 may be, for example, different versions of the same OS (e.g., different VMs running different current and legacy versions of the Windows® operating system). In addition, or alternatively, the VM OSs 2010 may be provided by different manufacturers (e.g., some VMs running the Windows® operating system, while other VMs are running the Linux® operating system). Each VM 2009 may also run one or more applications (Apps) 2011. Each server 2001 also includes storage 2012 (e.g., hard disk drives (HDD)) and memory 2013 (e.g., RAM) that can be accessed and used by the host processors 2007 and VMs 2009 for storing software code, data, etc.

Datacenter 2000 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2000 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2009 on server 20011 to run their applications 2011. When demand for an application 2011 increases, the datacenter 2000 may activate additional VMs 2009 on the same server 20011 and/or on a new server 2001N as needed. These additional VMs 2009 can be deactivated if demand for the application later drops.

Datacenter 2000 may offer guaranteed availability, disaster recovery, and back-up services. For example, the datacenter may designate one VM 2009 on server 20011 as the primary location for the tenant's application and may activate a second VM 2009 on the same or a different server as a standby or back-up in case the first VM or server 20011 fails. The datacenter management controller 2002 automatically shifts incoming user requests from the primary VM to the back-up VM without requiring tenant intervention. Although datacenter 2000 is illustrated as a single location, it will be understood that servers 2001 may be distributed to multiple locations across the globe to provide additional redundancy and disaster recovery capabilities. Additionally, datacenter 2000 may be an on-premises, private system that provides services to a single enterprise user or may be a publicly accessible, distributed system that provides services to multiple, unrelated customers and tenants or may be a combination of both.

Domain Name System (DNS) server 2014 resolves domain and host names into IP addresses for all roles, applications, and services in datacenter 2000. DNS log 2015 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2016 monitors the health of the physical systems, software, and environment in datacenter 2000. Health monitoring 2016 provides feedback to datacenter managers when problems are detected with servers, blades, processors, or applications in datacenter 2000 or when network bandwidth or communications issues arise.

Access control service 2017 determines whether users are allowed to access particular connections and services provided at the datacenter 2000. Directory and identity management service 2018 authenticates user credentials for tenants on datacenter 2000.

Figure 21:
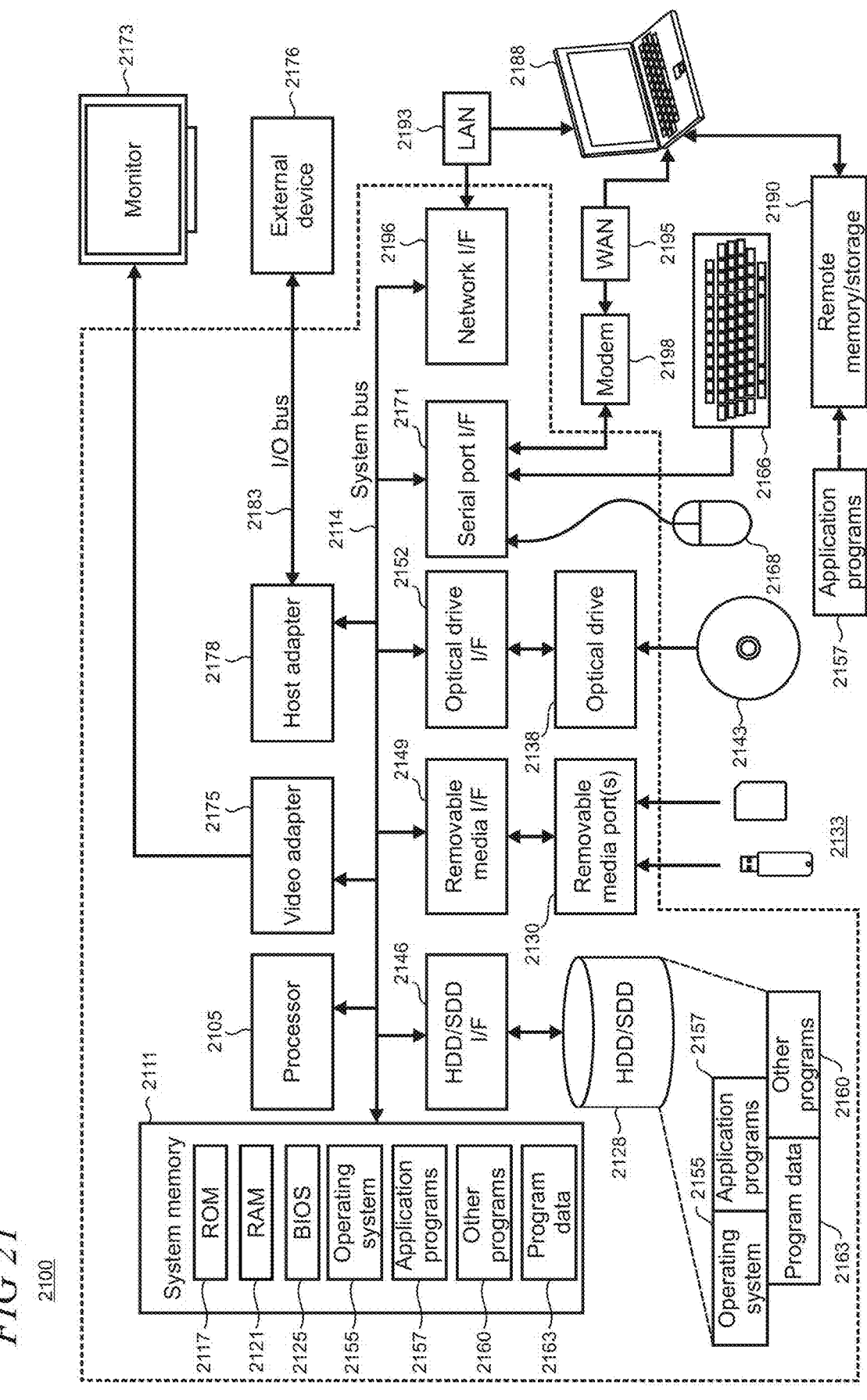
FIG. 21 is a block diagram of an illustrative computer system that may be used at least in part to implement the present endpoint security groups in private MEC networks.

FIG. 21 is a simplified block diagram of an illustrative computer system 2100 such as a PC, client machine, or server with which to implement the present endpoint security groups in private MEC networks. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive (HDD) or solid state drive (SSD) 2128 for reading from and writing to internally disposed storage media, removable media port(s) 2130 for reading from or writing to removable media 2133 (e.g., a flash drive/memory stick or card), and an optical disk drive 2138 for reading from or writing to a removable optical disk 2143 such as a CD (compact disc), DVD (digital versatile disc), or other optical media. The hard disk drive 2128, removable media ports 2130, and optical disk drive 2138 are connected to the system bus 2114 by a hard disk drive interface 2146, a removable media interface 2149, and an optical drive interface 2152, respectively. The drives and their associated computer-readable storage media provide non-volatile storage of computer-readable instructions, data structures, program modules, and other data for the computer system 2100. Although this illustrative example includes an HDD/SDD 2128, a removable media 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present endpoint security groups in private MEC networks. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the HDD/SDD 2128, removable media 2133, optical disk 2143, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, personal computers typically include other peripheral output devices (not shown), such as speakers and printers. The illustrative example shown in FIG. 21 also includes a host adapter 2178, an input/output (I/O) bus 2183 (which may be a serial bus such as USB), and an external device 2176 connected to the I/O bus 2183.

The computer system 2100 is operable in a networked environment using logical connections to one or more remote computers, such as a remote computer 2188. The remote computer 2188 may be selected as another personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory/storage device 2190. It is noted that the network connections shown in FIG. 21 are illustrative and other means of establishing a communications link between the computers may be used depending on the specific requirements of an application of the present endpoint security groups in private MEC networks.

FIG. 22 shows an illustrative mobile network that uses a service-based architecture (SBA) 2200 as defined by the 3GPP (3rd Generation Partnership Project). An SBA provides a modular framework from which common applications can be deployed using components of varying sources and vendors. Control plane functionality and common data repositories of the network are delivered by way of a set of Network Functions (NFs) that are interconnected with a service-based interface bus, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

As shown, the mobile network includes a core network (CN) 250 that is interoperable with 4G ($4^{th}$ generation) and 5G ($5^{th}$ generation) radio access networks (RANs) 2204 and 2206 that support wireless communications with UE 2201. The CN architecture 2200 supports a 5G next generation core (NGC) network that includes 4G evolved packet core (EPC) instances to enable some 4G LTE (Long Term Evolution) use cases when implementing the present endpoint security groups in private MEC networks. With 4G mode, some 5G components such as the UDR (unified data repository) 2205 and UPF (user plane function) 2210 support 4G mode without the need to revert to a legacy 4G stack. Other 4G components include an MME (mobility management entity) 2280 and IWF (interworking function) 2285.

The UPF handles user data, performing operations such as maintaining PDU (Protocol Data Unit) sessions, packet routing and forwarding, packet inspection, policy enforcement for the user plane, QOS (Quality of Service) handling, traffic usage reporting for billing, and the like. The UPF further provides an interconnection point between the mobile network infrastructure and an external data network (DN) 2265. The AF (application function) 2270 provides service or application related information to a VNF service consumer, for example, a mobile network or enterprise operator 2275.

The AMF (access and mobility management function) 2215 receives all connection and session related information from the UE 2201 but is only responsible for handling connection and mobility management tasks such as registration and authentication, identification, and mobility. All messages related to session management are forwarded over an interface to the Session Management Function (SMF) 2220 that establishes and manages sessions. It also selects and controls the UPF 2210 and handles paging. The AF 2270 provides service or application related information to the NF service consumer. For example, the AF performs operations such as retrieving resources and exposing services to end-users. Other 3GPP-defined 5G network functions in the architecture 2200 include SMF (session management function) 2220; PCF (policy control function) 2225; AUSF (authentication server function 2230; UDM (unified data management) 2235; and NRF (network repository function) 2240.

Various exemplary embodiments of the present endpoint security groups in private multi-access edge compute networks are now presented by way of illustration and not as an exhaustive list of all embodiments. An example includes a computer-implemented method using a multi-access edge compute (MEC) platform for managing security for a plurality of computing device endpoints operable in a networked computing environment, comprising: communicating with the endpoints from a computing server in the MEC platform, in which the endpoints are dynamically operable to join, leave, and rejoin the networked computing environment through an access network supporting multiple different access protocols; classifying the endpoints based on functional capabilities of the endpoints defined by one or more of computing device type, role, function, or location; associating the endpoints according to the classification by functional capabilities with different endpoint security groups; applying security policies to the endpoints based on their association with the different endpoint security groups, in which different IP (Internet Protocol) addresses are assigned to network connections utilized by endpoints upon each instance of joining or rejoining the networked computing environment, in which the security policies are applied to the endpoints independent of the assigned IP addresses; and independently of the assigned IP addresses, automatically reapplying the security policies to endpoints upon rejoining the networked computing environment subsequent to leaving the networked computing environment.

In another example, the computer-implemented method further comprises using an authentication process with the endpoints in which an endpoint role or profile provided by the authentication process is mapped to an endpoint security group. In another example, an endpoint supports multiple applications operating thereon, and each application uses a discrete network connection having a unique IP address assigned thereto. In another example, the endpoints are unassociated with an identification of a human user. In another example, the security policies govern access of the endpoints in each endpoint security group to the networked computing environment or govern utilization of the networked computing environment by the endpoints in each security group, wherein the networked computing environment supports services and resources relating to one of compute, storage, or network. In another example, the access network comprises one or more of Wi-Fi, fourth generation (4G) mobile network, or fifth generation (5G) mobile network.

A further example includes one or more hardware-based non-transitory computer-readable memory devices storing computer-executable instructions which, upon execution by one or more processors disposed in a computing server, cause the server to: receive requests through an access network from a plurality of Internet-of-Things (IoT) endpoints to join an enterprise computing environment, in which the access network supports multiple different access protocols; authenticate the IoT endpoints using an authentication process, the authentication process being dependent on the access protocol used by the IoT endpoints; in response to the requests, assign membership of the IoT endpoints to endpoint security groups, in which a plurality of different endpoint security groups is utilized and membership of the IoT endpoints in the endpoint security groups is based on features and functions supported by the IoT endpoints; and enforce security policies on the IoT endpoints based on endpoint security group membership, the enforcement of the security policies being independent from the access protocol used by the IoT endpoints.

In another example, each of the endpoints excludes a locally-implemented human-machine interface. In another example, the authentication process is adapted to map security policies to an endpoint security group. In another example, an endpoint is further grouped into a network security group and the security policies are enforced on the endpoint based on network security group membership. In another example, an endpoint is further grouped into an application security group and the security policies are enforced on the endpoint based on application security group membership. In another example, membership of the IoT endpoints in the endpoint security groups is based on physical location of the IoT endpoints within an area served by the access network. In another example, the server is operated in a multi-access edge compute (MEC) platform.

A further example includes a computing device endpoint, comprising: at least one processor; a network interface; a memory operatively coupled to the at least one processor; and at least one hardware-based non-transitory computer-readable storage device having computer-executable instructions stored thereon which, when executed by the least one processor, cause the endpoint to: operate dynamically in a cyclical manner to interact with a computing network controlled by an enterprise, the operations of the endpoint being based on a functional role or physical location of the endpoint in the enterprise; establish membership in one or a plurality of endpoint security groups, in which membership in a given endpoint security group is based on the functional role or physical location of the endpoint in the enterprise; and using the network interface, communicate through a locally-implemented access network to instantiate a computing session with the computing network, in which a new session is established with each instance of operation of the endpoint, wherein the interactions of the endpoint with the computing network are controlled according to policies enforced on the endpoint based on endpoint security group membership, in which the policies are consistently enforced during each of a plurality of computing sessions established between the endpoint and the computing network.

In another example, the policies comprise one or more of security policy, identity-based policy, or role-based policy. In another example, the endpoint comprises an Internet-of-Things (IoT) device. In another example, the endpoint comprises a multi-function device and each function of the endpoint has membership with a different endpoint security group. In another example, the executed instructions further cause the endpoint to be authenticated in accordance with an access protocol dependent on an access network type, in which membership in an endpoint security group is determined during authentication. In another example, the computing network is at least partially instantiated in a cloud-computing platform. In another example, the cloud-computing platform includes a multi-access edge compute (MEC) platform.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While some embodiments comprise/include the disclosed features and may therefore include additional features not specifically described, other embodiments may be essentially free of or completely free of non-disclosed elements—that is, non-disclosed elements may optionally be essentially omitted or completely omitted.

What is claimed:

1. A computer-implemented method using a multi-access edge compute (MEC) platform for managing security for a plurality of endpoints, wherein the endpoints are computing devices operable in a networked computing environment, comprising:

communicating with the endpoints from a computing server in the MEC platform, in which the endpoints are dynamically operable to join, leave, and rejoin the networked computing environment through an access network supporting multiple different access protocols;

classifying the endpoints based on functional capabilities associated with physical attributes of the endpoint computing devices defined by one or more of computing device type, role, function, or location;

associating the endpoints according to the classification by functional capabilities with different endpoint security groups;

applying security policies to the endpoints based on their association with the different endpoint security groups, in which different IP (Internet Protocol) addresses are assigned to network connections utilized by endpoints upon each instance of joining or rejoining the networked computing environment, in which the security policies are applied to the endpoints independent of the assigned IP addresses; and independently of the assigned IP addresses, automatically reapplying the security policies to endpoints upon rejoining the networked computing environment subsequent to leaving the networked computing environment.

2. The computer-implemented method of claim 1 further comprising using an authentication process with the endpoints in which an endpoint role or profile provided by the authentication process is mapped to an endpoint security group.

3. The computer-implemented method of claim 1 in which an endpoint supports multiple applications operating thereon, and each application uses a discrete network connection having a unique IP address assigned thereto.

4. The computer-implemented method of claim 1 in which the endpoints are unassociated with an identification of a human user.

5. The computer-implemented method of claim 1 in which the security policies govern access of the endpoints in each endpoint security group to the networked computing environment or govern utilization of the networked computing environment by the endpoints in each security group, wherein the networked computing environment supports services and resources relating to one of compute, storage, or network.

6. The computer-implemented method of claim 1 in which the access network comprises one or more of Wi-Fi, fourth generation (4G) mobile network, or fifth generation (5G) mobile network.

7. One or more hardware-based non-transitory computer-readable memory devices storing computer-executable instructions which, upon execution by one or more processors disposed in a computing server, cause the server to:

receive requests through an access network from a plurality of Internet-of-Things (IoT) endpoints to join an enterprise computing environment, in which the access network supports multiple different access protocols, wherein the IoT endpoints are computing devices;

authenticate the IoT endpoints using an authentication process, the authentication process being dependent on the access protocol used by the IoT endpoints;

in response to the requests, assign membership of the IoT endpoints to endpoint security groups, in which a plurality of different endpoint security groups is utilized and membership of the IoT endpoints in the endpoint security groups is based on features and functions supported by physical attributes of the IoT endpoints; and enforce security policies on the IoT endpoints based on endpoint security group membership, the enforcement of the security policies being independent from the access protocol used by the IoT endpoints.

8. The one or more hardware-based non-transitory computer-readable memory devices of claim 7 in which each of the endpoints excludes a locally-implemented human-machine interface.

9. The one or more hardware-based non-transitory computer-readable memory devices of claim 7 in which the authentication process is adapted to map security policies to an endpoint security group.

10. The one or more hardware-based non-transitory computer-readable memory devices of claim 7 in which an endpoint is further grouped into a network security group and the security policies are enforced on the endpoint based on network security group membership.

11. The one or more hardware-based non-transitory computer-readable memory devices of claim 7 in which an endpoint is further grouped into an application security group and the security policies are enforced on the endpoint based on application security group membership.

12. The one or more hardware-based non-transitory computer-readable memory devices of claim 7 in which membership of the IoT endpoints in the endpoint security groups is based on physical location of the IoT endpoints within an area served by the access network.

13. The one or more hardware-based non-transitory computer-readable memory devices of claim 7 in which the server is operated in a operated in a multi-access edge compute (MEC) platform.

14. A computing device endpoint, comprising:

at least one processor;

a network interface;

a memory operatively coupled to the at least one processor; and at least one hardware-based non-transitory computer-readable storage device having computer-executable instructions stored thereon which, when executed by the at least one processor, cause the endpoint to:

operate dynamically in a cyclical manner to interact with a computing network controlled by an enterprise, the operations of the endpoint being based on physical attributes of the endpoint in the enterprise;

establish membership in one or a plurality of endpoint security groups, in which membership in a given endpoint security group is based on the physical attributes of the endpoint; and using the network interface, communicate through a locally-implemented access network to instantiate a computing session with the computing network, in which a new session is established with each instance of operation of the endpoint, wherein the interactions of the endpoint with the computing network are controlled according to policies enforced on the endpoint based on endpoint security group membership, in which the policies are consistently enforced during each of a plurality of computing sessions established between the endpoint and the computing network.

15. The endpoint of claim 14 in which the policies comprise one or more of security policy, identity-based policy, or role-based policy.

16. The endpoint of claim 14 in which the endpoint comprises an Internet-of-Things (IoT) device.

17. The endpoint of claim 14 in which the endpoint comprises a multi-function device and each function of the endpoint has membership with a different endpoint security group.

18. The endpoint of claim 14 in which the executed instructions further cause the endpoint to be authenticated in accordance with an access protocol dependent on an access network type, in which membership in an endpoint security group is determined during authentication.

19. The endpoint of claim 14 in which the computing network is at least partially instantiated in a cloud-computing platform.

20. The endpoint of claim 19 in which the cloud-computing platform includes a multi-access edge compute (MEC) platform.

* * * * *